Figure 1:
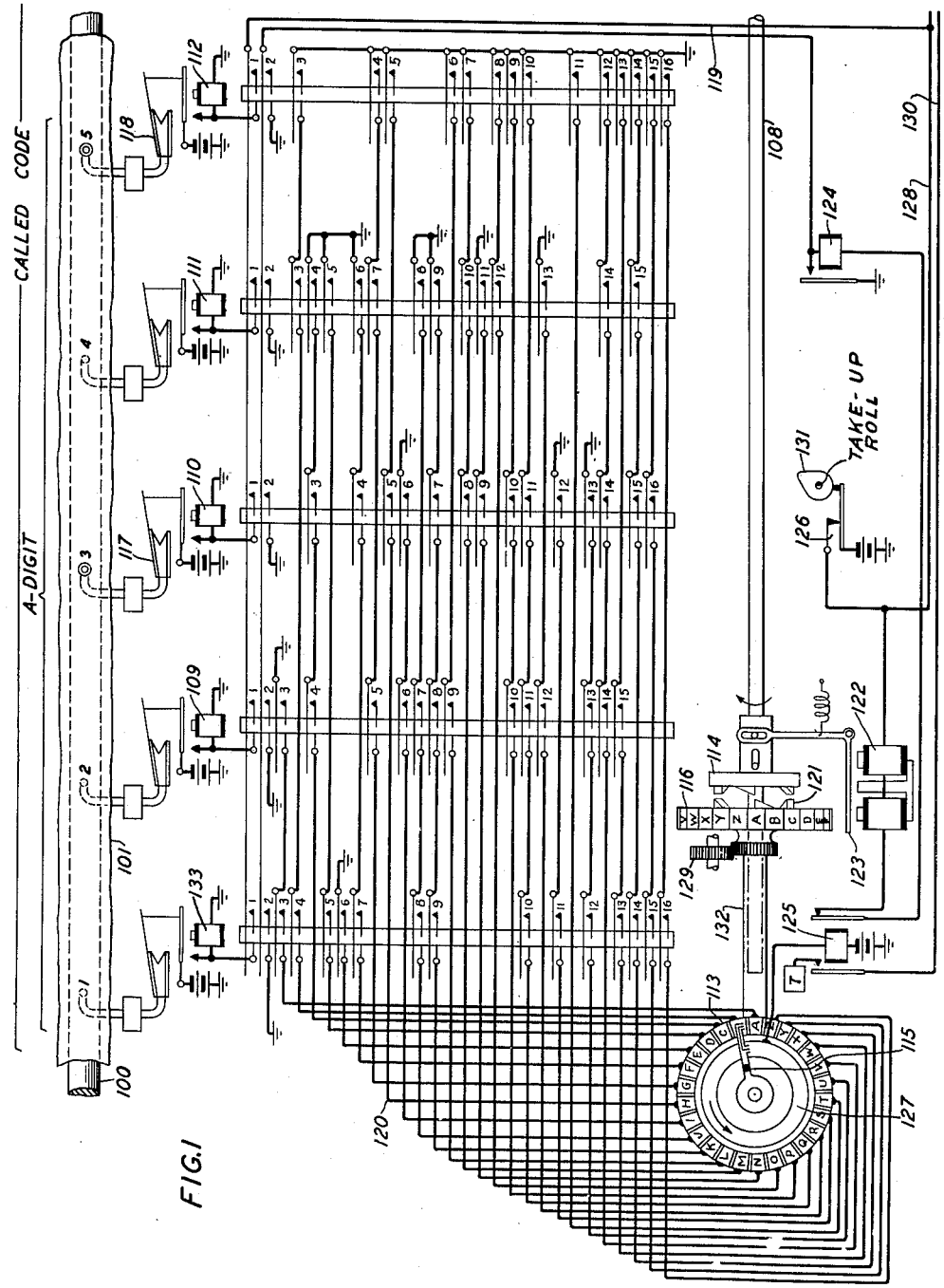

Jan. 4, 1944.   C. L. GOODRUM ET AL   2,338,636
AUTOMATIC BILLING SYSTEM
Original Filed Nov. 15, 1933   12 Sheets-Sheet 1

INVENTORS:   C.L. GOODRUM
E.E. HINRICHSEN
L. KELLER
BY   P. C. Smith
ATTORNEY

Jan. 4, 1944.　　C. L. GOODRUM ET AL　　2,338,636
AUTOMATIC BILLING SYSTEM
Original Filed Nov. 15, 1933　　12 Sheets-Sheet 4

INVENTORS: C. L. GOODRUM
E. E. HINRICHSEN
L. KELLER
BY P. C. Smith
ATTORNEY

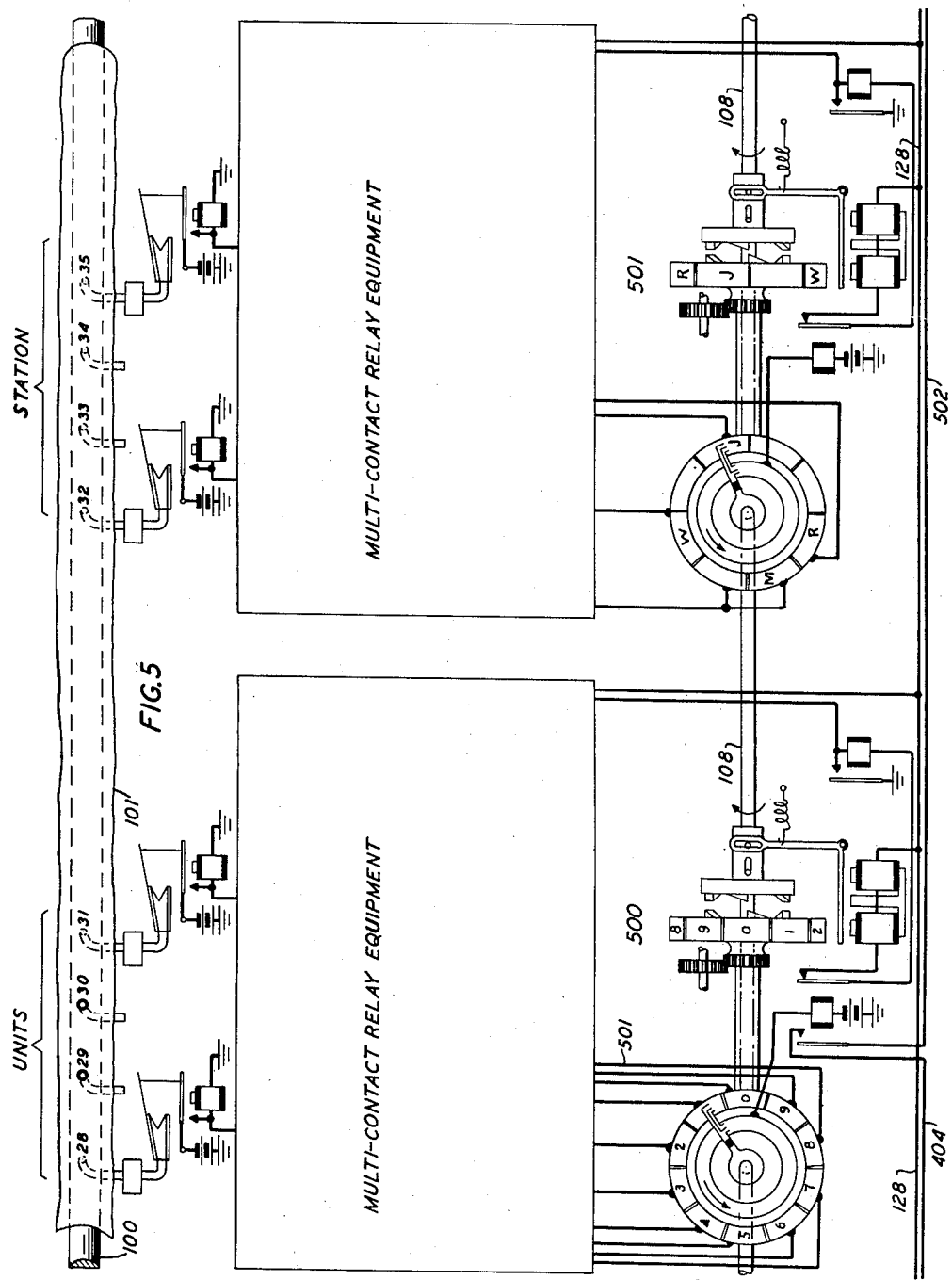

Jan. 4, 1944.  C. L. GOODRUM ET AL  2,338,636
AUTOMATIC BILLING SYSTEM
Original Filed Nov. 15, 1933    12 Sheets-Sheet 6
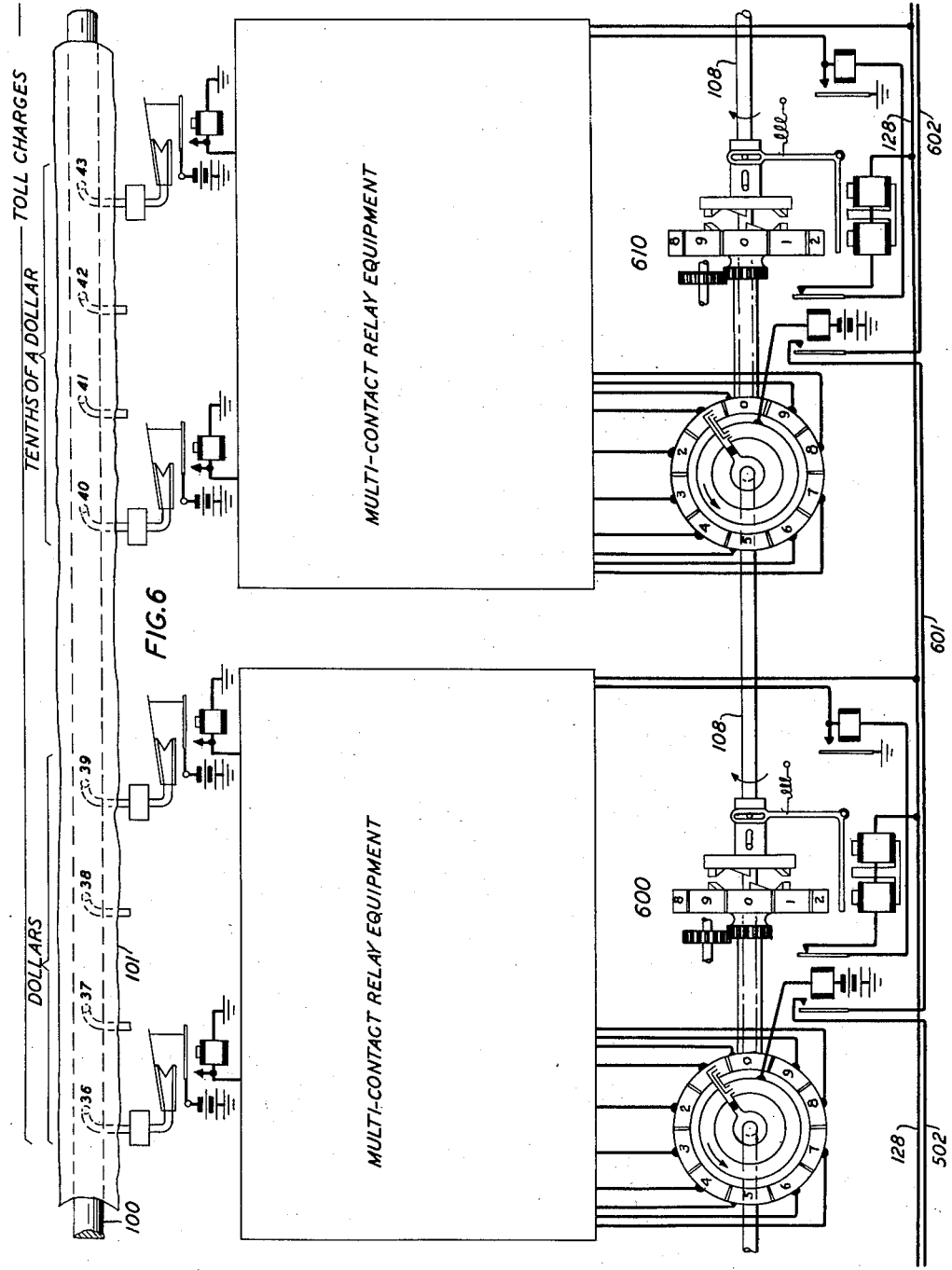
INVENTORS: C.L. GOODRUM
E.E. HINRICHSEN
L. KELLER
BY P. C. Smith
ATTORNEY

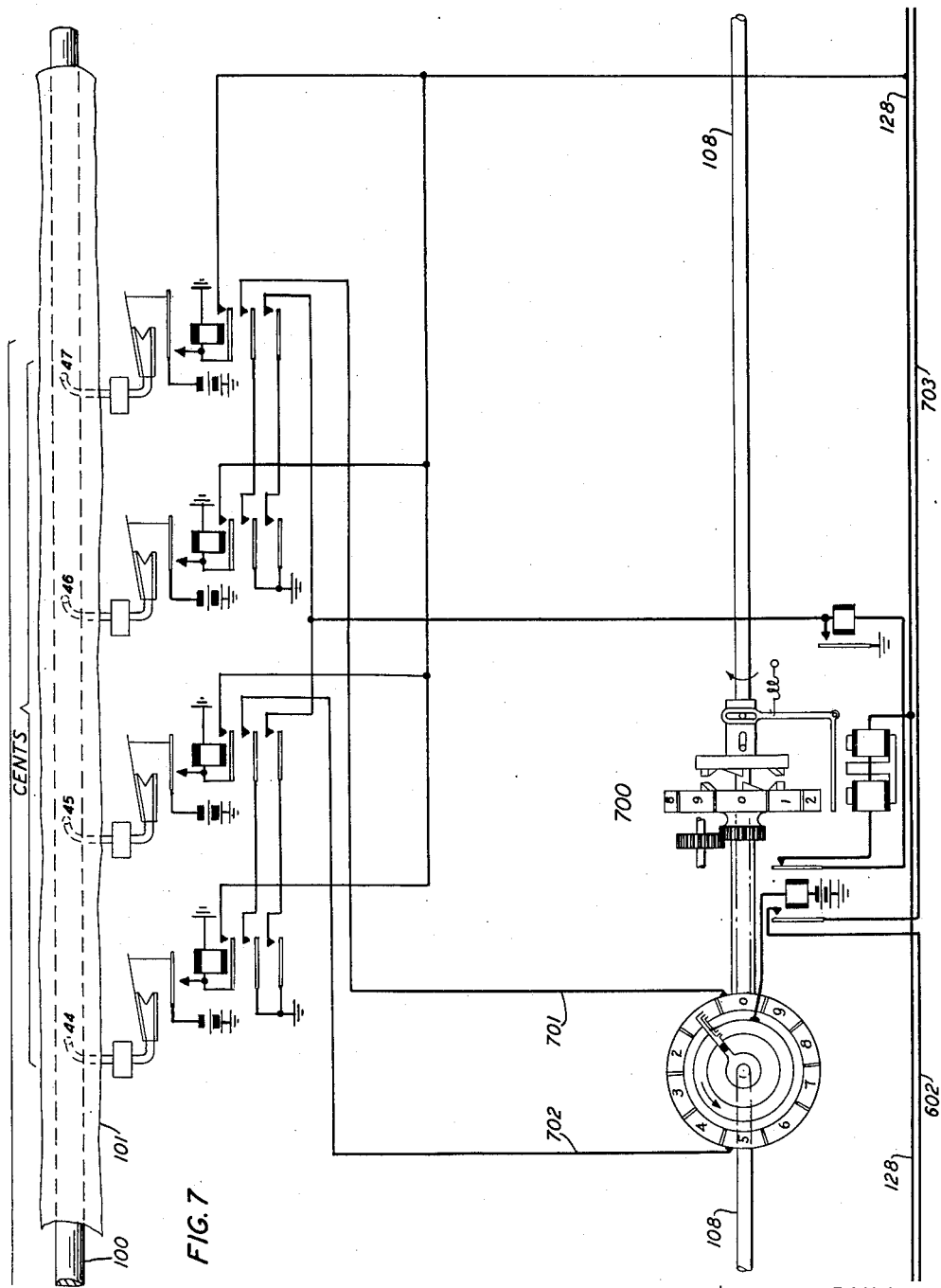

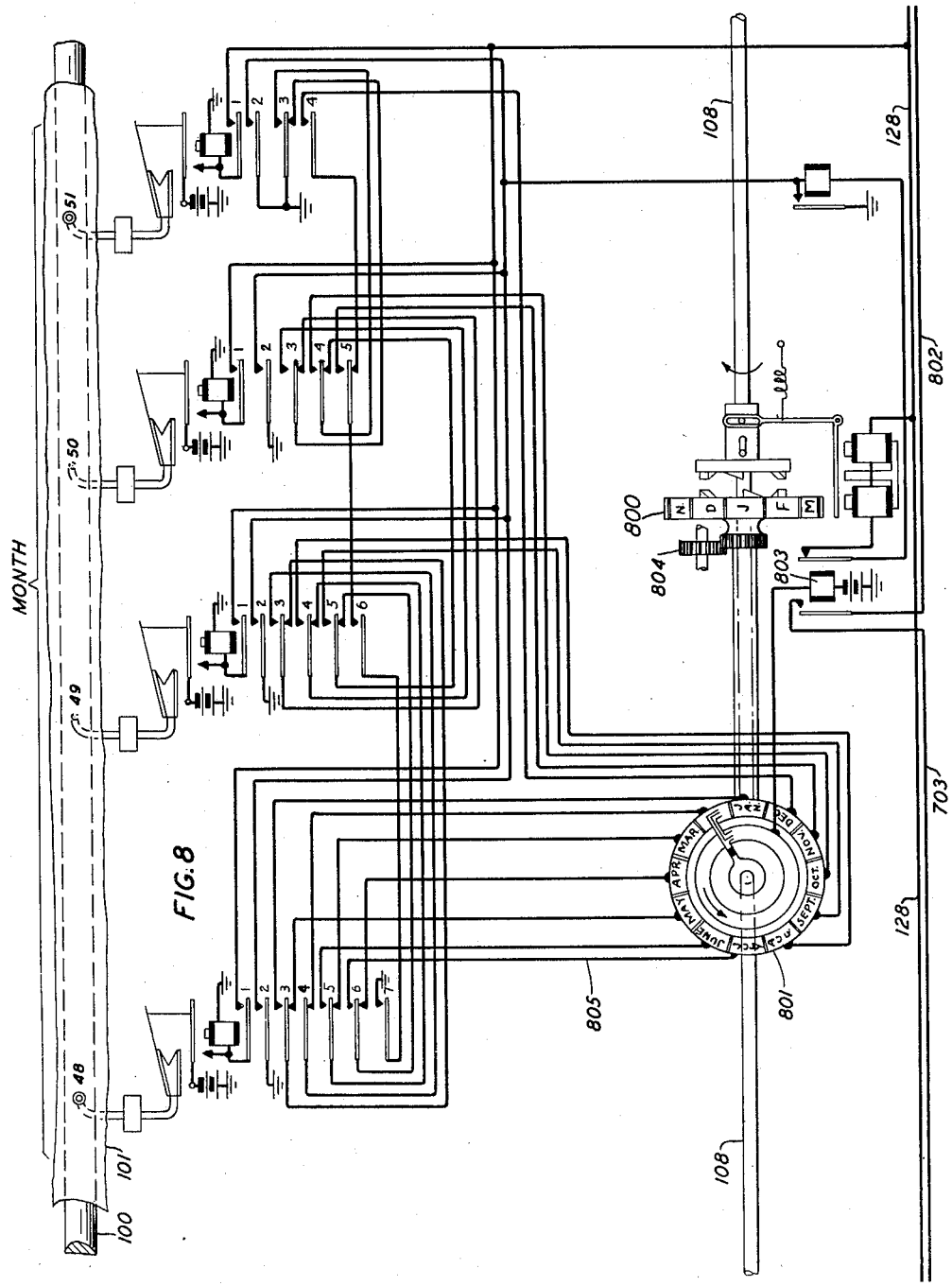

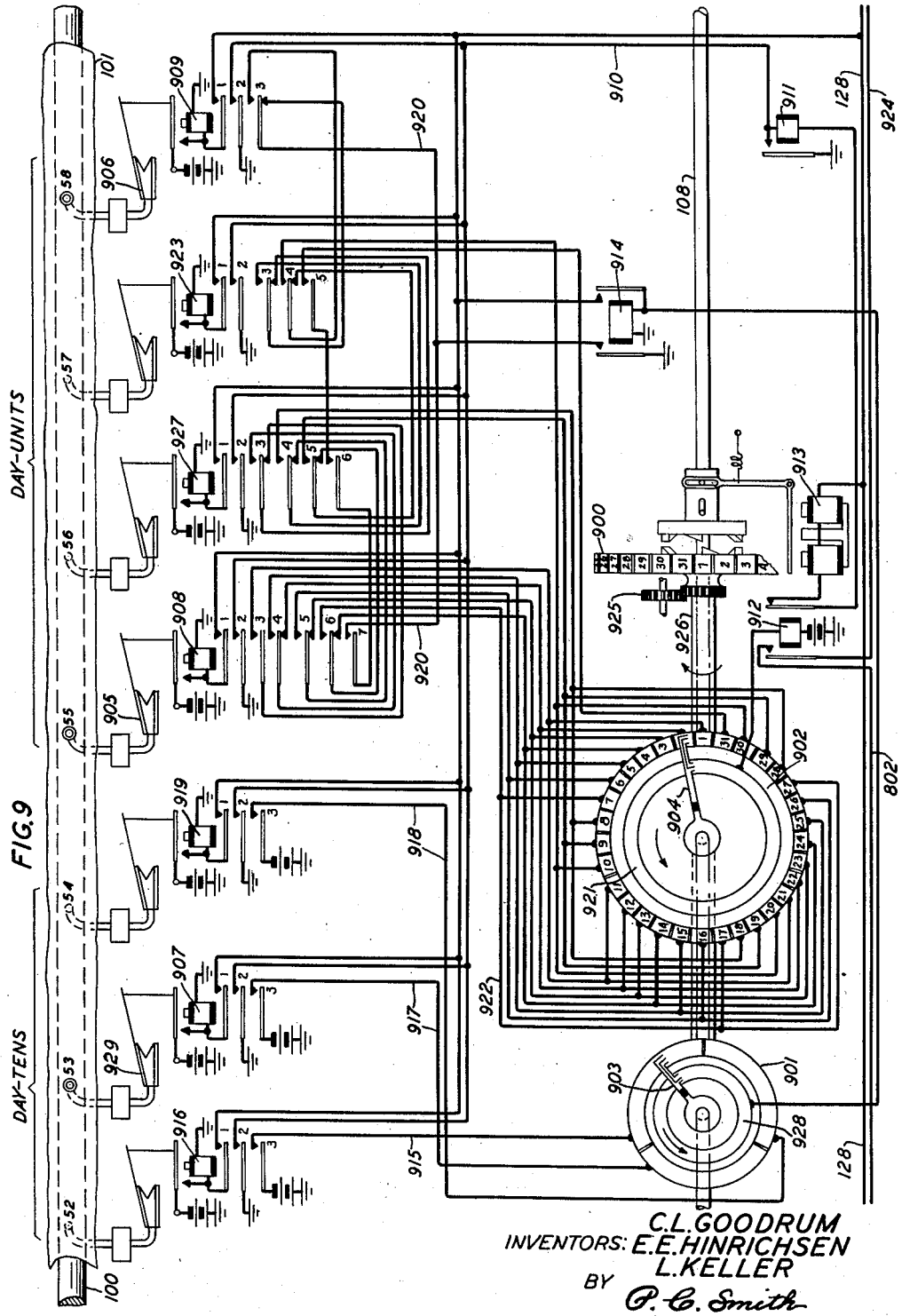

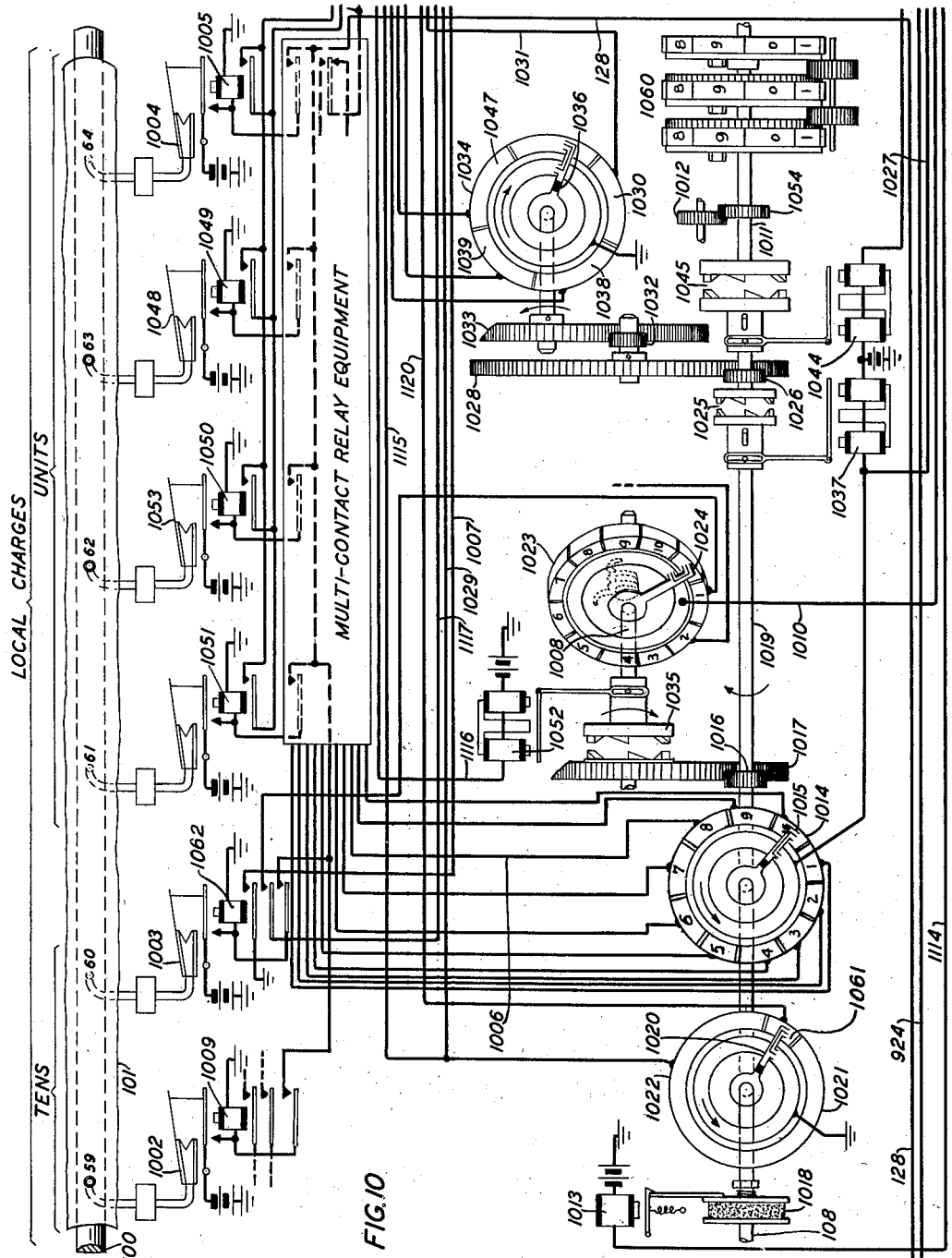

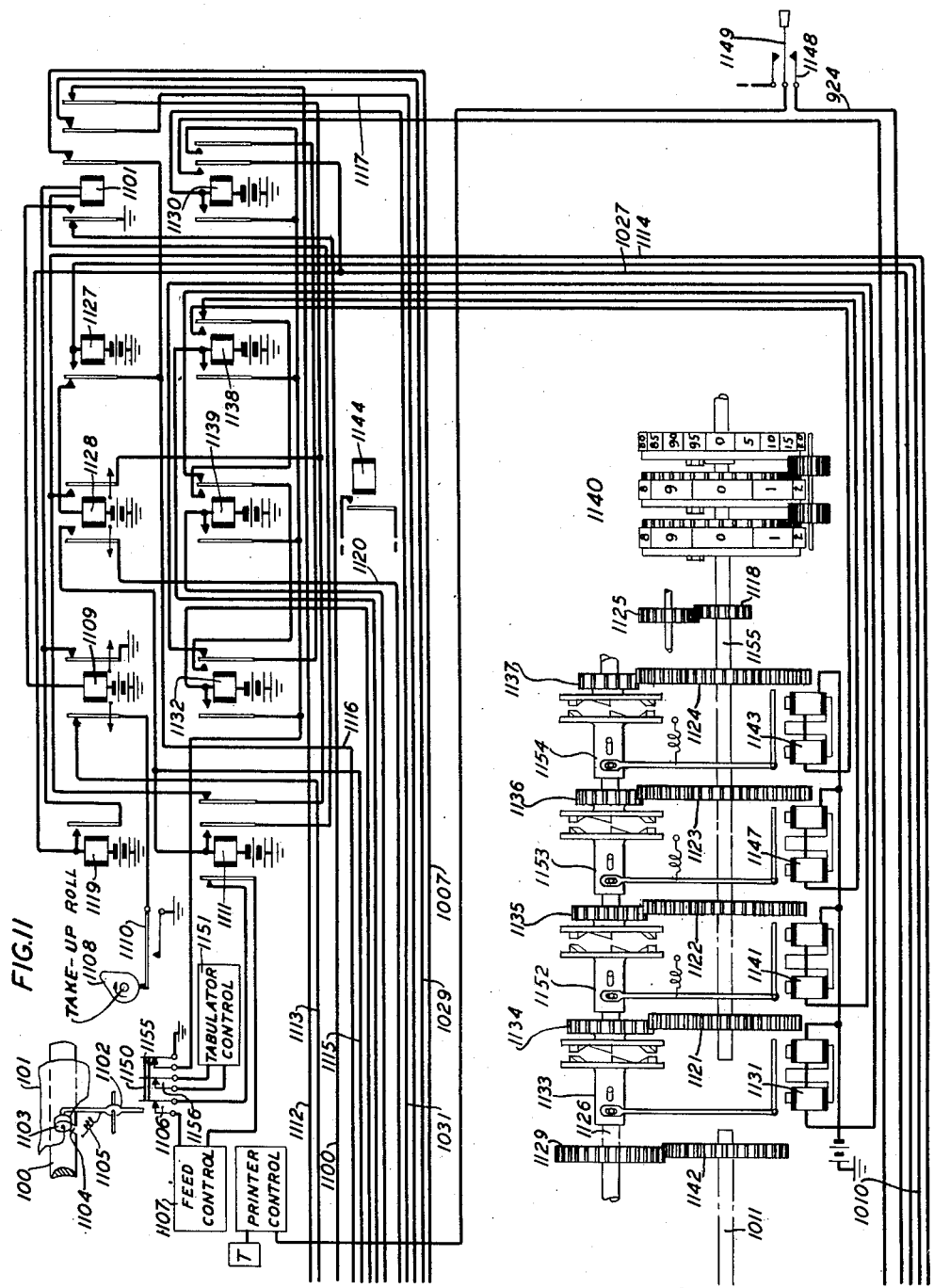

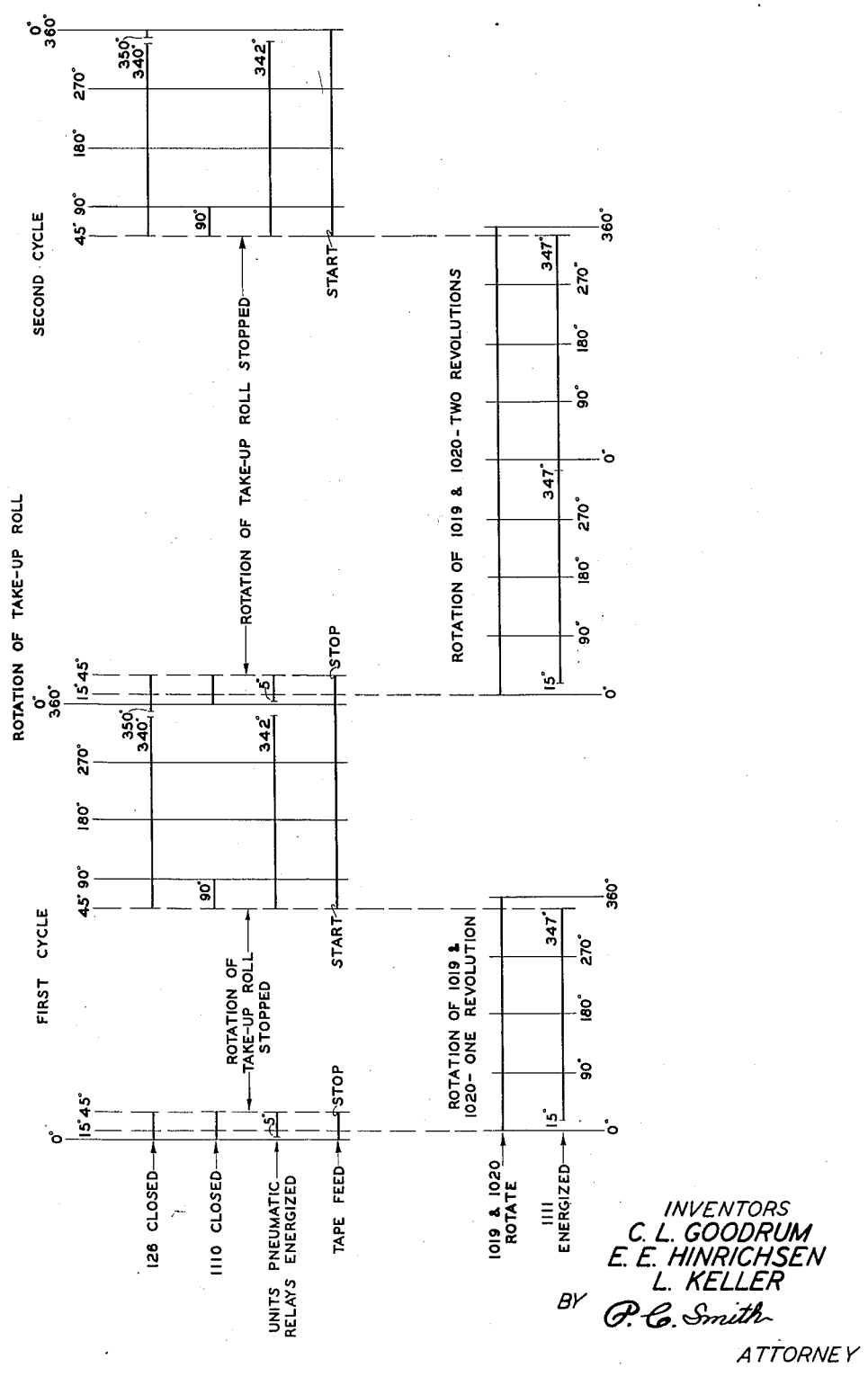

Patented Jan. 4, 1944

2,338,636

UNITED STATES PATENT OFFICE

2,338,636

AUTOMATIC BILLING SYSTEM

Charles L. Goodrum, New York, N. Y., and Edward E. Hinrichsen, Pasadena, and Leo Keller, West Los Angeles, Calif., assignors to Bell Telephone Laboratories, Incorporated, New York, N. Y., a corporation of New York Original application November 15, 1933, Serial No. 698,046, now Patent No. 2,165,925, dated July 11, 1939. Divided and this application December 8, 1937, Serial No. 178,636

8 Claims. (Cl. 235—61.6)

This invention relates to automatic billing systems and more particularly to a system adapted for use with telephone lines in which a continuous record of the details of calls made from said lines over a stated billing period operates a tabulating and printing mechanism which produces a tabulated, computed and printed bill for the line to which said record appertains.

This application is a division of our Patent 2,165,925 issued on July 11, 1939, which describes the billing system as a whole, and is particularly directed to the printing tabulator which operates from a prepared line record containing the complete data of each call made from the line over a defined billing period. The operations performed by the printing tabulator, in response to the record, result in producing a printed bill which may be forwarded to the subscriber.

According to the above-mentioned patent the general principle upon which the invention operates is the making, upon a suitable medium, of a record of each call by means of a recording mechanism common to a group of lines. This record includes, for each call recorded, the date when the call was made, an identifying designation of the calling line, the code of the called office, the number of the called station, the duration of the conversation, and such other items as are found necessary for billing purposes. This call record, in the preferred form of the invention, is made upon a wide tape somewhat of the size and character of a player piano roll and the information recorded thereon is perforated by a punching machine having a plurality of magnets that operate simultaneously to punch the record across the tape. Since according to the above-mentioned patent, this perforating machine is common to a group of lines such as, for example, a group that terminates on a line-finder frame, the record strip or "primary" tape produced by this machine contains the perforations, in suitable code form, of all the calls made by all the lines in the group. These call records are not grouped with respect to each of the lines from which the calls were made; rather they are recorded successively for each line in the order or sequence in which the separate calls are made from the separate lines throughout the billing period. The call records must then be sorted and assembled for each line in order that an individual record for each line can be prepared and with which the printing tabulator covered by the present application can be operated to produce the printed bill. The equipment for sorting the calls to produce an individual record for each line is shown and described in the above mentioned patent and comprises a translator which has a suitable number of tape perforating machines controlled by it, there being, according to one preferred arrangement, one translator per calling line group with as many perforating machines for each translator as there are lines in the group so that a single passage of the primary tape strip through the translator will suffice to make a separate and individual record for each line. Inasmuch as the primary tape is in the form of a continuous roll having code perforations thereon, the translator contains a series of pneumatic devices which are responsive to these perforations as the record of each call on the primary tape comes into alignment over the air channels of the pneumatic devices. The response of the translator to the code of the identification number of the calling line causes the selection of the proper perforating machine, thus distributing the registration of the call records to each of the separate recording machines correlated to each of the different lines in the group.

Before passing the primary tape through the translator, however, it is necessary to identify the so-called directory number of the calling line with its line finder or terminal code number, the relation of which to the directory number is purely arbitrary, and this is done by means of a "master" record which is run through the translator ahead of the primary tape. This master record causes the translator to punch on each of the individual line records to be prepared by the separate perforating machines the directory number of the line and such information as to the class of service to which the line is entitled as is necessary for a proper computation of the bill.

Those pneumatic devices in the translator which respond to the perforations of the called office code and the elapsed time of a call control the operation of a computer which calculates the charge for the call and determines whether or not the call is to be itemized on the bill. As soon as this computation is made, the charge and, if the call is to be itemized, the date, the office code and number of the calling line are punched on the line record by that perforating machine of the translator which was selected by the calling line terminal number.

The passage of the primary tape through the translator thus produces a set of individual line records each of which, in the preferred embodiment of the invention, contains a record of local calls merely as individual charges and toll calls in detail. The calls for each line will, of course, appear on these separate line records in the order in which they were made and in a code suitable for the operation of the printing tabulator.

Inasmuch as the present application is directed specifically to the printing tabulator, a clearer conception of its scope and purpose may be obtained from a consideration of the following drawings in which Figs. from 1 to 11, inclusive, arranged consecutively from left to right with Fig. 1 at the left end and Fig. 11 at the right disclose, broadly, a printing tabulator which is arranged to operate in response to the continuous perforated record or "secondary" tape prepared by the translator shown and described in the parent patent. Fig. 12 is a timing chart indicating the operation of certain elements of the mechanism.

The secondary tape will be assumed to contain a record of all local and toll calls, for a billing period, made from the subscriber's line. Consequently when the tape is completed it is passed through the printing tabulator, which is responsive to the perforations denoting the several calls. The tabulator, through its operation, adds up the local calls in the equivalent number of local charge units and prints the total charges therefor on what may be called the "local service charge" bill. It further prints an itemized list of all toll calls.

As already indicated, the printing tabulator herein described and claimed uses a pneumatic system for controlling the electrical elements which operate in response to the perforations on the secondary tape. This pneumatic system comprises a series of valves each adapted to contract the movable member of a pair of bellows, normally kept inflated by air at atmospheric pressure, when the valve is lifted by atmospheric air entering a valve chamber that is kept at a partial vacuum. The collapse of the bellows controls the operation of a signaling device. And, of course, when the supply of outside air is cut off by the secondary tape covering the aperture through which the air is admitted, the valve chamber is again reduced to a partial vacuum, the valve is reseated in the chamber roof, the bellows are again expanded and the contacts carried thereby to close the circuits of the signaling device are opened, leaving said device under the control of a separate locking circuit. Accordingly, this pneumatic system further has a tracker bar with atmospheric openings connected to a number of "pneumatics" (valve chambers) equal to the number of punch positions on the secondary tape, while the motor control of the feeding mechanism is made responsive to the presence of the tape roll on the surface of the tracker bar.

Figs. 1 to 11, inclusive, illustrate the presence of the secondary tape across the tracker bar of the tabulator. There are sixty-four pneumatics to correspond with the sixty-four punch positions of the secondary tape. Most of these pneumatics control relays each having a contact assembly which, separately or in combination with contact assemblies of other pneumatically controlled relays of the code group which records a particular item of information, controls the responsive circuits of the printing tabulator as more particularly described hereinafter. The tracker bar 100 is shown extending across Figs. 1 to 11, inclusive, with the secondary tape 101 threaded over it. In Fig. 11 is disclosed a spring depressed rocker arm 1102 which carries a roller 1103 held lightly in the groove 1104 of said tracker bar by spring 1105 when no tape is on the tracker bar and causes the arm controlled contact assembly 1150 to be held open. When, however, the tape covers the surface of the bar and, therefore, the surface of the groove 1104, roller 1103 is forced out of the groove to tilt the arm 1102 and thereby cause the closure of contacts 1106, 1155 and 1156. The closure of contacts 1106 closes the circuit of the tape feed motor control 1107, said circuit being controlled through the left back contacts of relay 1111, which is normal at this time, operating the main shaft motor (not shown) for rotating the take-up roll by means of which the tape is advanced across the tracker bar. The closure of contacts 1156 closes the circuit of tabulator motor control 1151 which rotates the shaft 108 to supply power to the tabulating elements of the mechanism as hereinafter described. The tape 101 is thus advanced across the face of the tracker bar 100, bringing successive rows of call perforations into alignment over the tracker bar holes. The feed control mechanism 1107 includes a take-up roll for advancing the tape, which is operated by a motor the circuit of which is closed by contacts 1106 and the left contacts of relay 1111. This roll has mounted thereon (or upon any suitable shaft geared thereto) cams 131 and 1108, the former controlling the battery contacts 126 and the latter the ground contacts 1110. Cam 131 is so designed that when the record tape is fed across the tracker bar, contacts 126 are closed from the time a row of perforations on the record tape is substantially aligned over the holes of the tracker bar so as to expose said holes to the atmosphere, to the time when the record tape is advanced to a position a little before the perforations of the next row begin to uncover said holes to the atmosphere, at which time said contacts open and do not close again until said holes are partially uncovered by said perforations. Cam 1108, on the other hand, is so designed that contacts 1110 are closed to supply ground over the left contacts of relay 1109 only during the time when said tracker bar holes are fully exposed to the atmosphere by a row of perforations and for a small interval beyond that when they are closed to the atmosphere. Stating the latter in terms of the rotation of the take-up roll, and assuming that the 0 or starting point of a rotation of said roll to be when a row of perforations is substantially aligned over the holes of the tracker bar, then contacts 1110 are closed for a quarter of a revolution of the shaft, at which position the perforations will have been advanced well past the tracker bar holes, which are then closed to the atmosphere. Shaft 108 operated by the motor of the tabulator control 1151, need not be operated at the same speed as the take-up roll, but may be operated at any suitable speed. For the purpose of illustrating the operation of the invention, however, it will here be assumed that the speed of the shaft and that of the take-up roll are the same.

Looking at the tape from left to right, the punch positions as therein shown are identical with those shown in relation to the punch magnets of the secondary punch machine of the translator shown and described in the above-mentioned patent, and the tracker bar holes correspond with the punch positions of the tape. The coded information therein recorded, therefore, is in the following order:

Called office code—positions 1 to 15, inclusive
Calling line number } positions 16 to 35, inclusive
Called office number
Toll charges—positions 36 to 47, inclusive
Date—positions 48 to 58, inclusive
Local charges—positions 59 to 64, inclusive The general principle controlling the operation of the printing tabulator is:

(A) The setting of the appropriate letter wheels and counters in the case of toll calls for printing (1) the letter code of the called office and the number of the called subscriber; (2) the money charge therefor; and (3) the date;

(B) The setting of the appropriate counters in the case of local calls for adding up the total number of minimum local charge units for all calls beyond the minimum of such charges allotted to a subscriber for a billing period and at stated rate units which may diminish with the total units used.

The printer mechanism of the tabulator can be conveniently divided into two parts, one part responsive to the toll entries which are to be printed on a slip of paper as entered, and the other part responsive to the local service units which are added successively.

Referring now to the above-mentioned Figs. 1 to 11, inclusive, each of the pneumatics responsive to each of the punch positions 1 to 5, inclusive, operate multi-contact relays 109, 110, 111, 112 and 133. These pneumatics operate in response to the code perforations in these positions which indicate the first letter of the called office name.

As pointed out in the above-mentioned patent, the code perforations punched in positions 1 to 5 correspond to the five-unit code of the first letter representing the called office name and since, generally speaking, this letter may be any one of the twenty-six letters of the alphabet, the pneumatics operate in such combinations as to ground any one of twenty-six different conductors, one for each letter. These conductors are extended to the twenty-six separate segments of the commutator 113. Since, however, the letters Q and Z are generally not used in office names, the conductors which extend to segments Q and Z of the commutator may be omitted if desired. The distributor brush 115 and the letter wheel 116 are mounted on sleeve 132 and normally do not partake of the rotational movement of shaft 108, as described hereinafter.

In order to describe how the setting of the letter wheel 116 is effected, consider the operations of that part of the apparatus which is shown in Fig. 1. When the secondary tape is attached to the tracker bar 100 and the contacts 1106 of the feed control apparatus 1107 are closed and, as a result thereof, the tape is advanced to the position where the perforations of the first call are aligned over the corresponding tracker bar openings, then if we assume for illustration that the called office name is Halifax, there will be holes punched in positions 3 and 5 to designate the letter H in accordance with the following code:

| Punch positions | Digit or letter designation |
|---|---|
| 1, 2 | A |
| 1, 4 | B |
| 2, 3, 4 | C |
| 1, 4 | D |
| 1 | E |
| 1, 3, 4 | F |
| 2, 4, 5 | G |
| 3, 5 | H |
| 2, 3 | I |
| 1, 2, 4 | J |
| 1, 2, 3, 4 | K |
| 2, 5 | L |
| 3, 4, 5 | M |
| 3, 4 | N |
| 4, 5 | O |
| 2, 3, 5 | P |
| 1, 2, 3, 5 | Q |
| 2, 4 | R |
| 1, 3 | S |
| 5 | T |
| 1, 2, 3 | U |
| 2, 3, 4, 5 | V |
| 1, 2, 5 | W |
| 1, 3, 4, 5 | X |
| 1, 3, 5 | Y |
| 1, 5 | Z |

Under these circumstances pneumatics 117 and 118 will collapse and cause their respective battery-carrying springs connected to the moving bellows to swing downwards and engage their stationary contacts connected to the windings of their respective relays. As a result, an obvious circuit is completed for relay 110 and also for relay 112 whereupon these relays operate and close their multicontact assemblies. In particular, they close their respective No. 1 contact sets to common conductors 119 and 128, locking each of these relays to grounded battery through contacts 126 which are closed at this time. A circuit is now completed which extends from ground over the No. 5 contact set of multicontact relay 112, No. 5 contact set of multicontact relay 110, conductor 120, to commutator segment H.

Now the letter wheel 116 and brush 115 are mounted on sleeve 132 which is mounted loosely on shaft 108 that is constantly driven by the tabulator control 1151 at the speed of the tape take-up roll controlled by the feed control mechanism 1107. Thus, the turning movement of the shaft will not actuate the sleeve 132 until it is brought into positive connection therewith. The connection of the sleeve with the shaft 108 is effected by means of a clutch 121 comprising the clutch teeth on wheel 116 cooperating with the teeth on disc 114 splined on the shaft 108 so that it will slide on the shaft and turn therewith. This clutch member, however, is effective only in one direction of rotation thus avoiding any reversal of movement and permitting the operation of the mechanism at high speed and without objectionable vibration. The spring retracted armature 123 of the clutch control magnet 122 is in the form of a bell crank the dependent arm of which is suitably connected to the hub of the clutch disc 114 so that when the control magnet is energized, its armature will be attracted toward the magnet the movement of which will carry the clutch disc connected therewith into locking engagement with the letter wheel 116. The operation of relay 110 or 112 also closes a circuit for relay 124 in series with the clutch magnet 122, which circuit extends from ground on the No. 2 contact set of either relay, winding of relay 124, contacts of relay 125, clutch magnet 122, contacts 126, to grounded battery. Magnet 122 operates and throws the revolving clutch disc 114 into engagement with the letter wheel 116. Relay 124 operates and locks through its contacts in series with the magnet 122. The control of the letter wheel by magnet 122 thus established by the operated pneumatics is maintained notwithstanding the relatively brief duration of the pneumatic contact assembly closures which are operated only during the alignment of the punched holes over their associated tracker bar channel openings. Further, the previously grounded conductor 120 traced through the contact paths of the operated multicontact relays, is also undisturbed by the reinflation of the pneumatics and the consequent opening of their respective contact assemblies since the multicontact relays 110 and 112, originally operated by the collapse of the pneumatics, are now locked under the control of contacts 126 independent of the contact assemblies carried by the pneumatics. The magnet circuit is locked under the control of the contacts of relay 125 and contacts 126 the latter of which break the circuit simultaneously through magnet 122 as well as other magnets, as described hereinafter.

In the meanwhile, the engagement of the clutch disc 114 with the letter wheel 116 imparts movement to the latter. Since, however, the distributor brush 115 of the commutator is connected to wheel 116 through sleeve 132, the movement of the wheel, when engaged with the clutch, also imparts movement to the distributor arm. As the wheel revolves, successive letters on its periphery are advanced to face the sight position (not shown) and, at the same time, distributor brush 115 is rotated over the successive segments of commutator 113. When the letter H on the tape wheel is advanced to the sight position, the distributor arm is in contact with commutator segment H whereupon a circuit is closed which extends from grounded battery through the winding of relay 125, commutator ring 127, distributor brush 115, commutator segment H, conductor 120 to ground on the No. 5 contact of relay 112 as previously described. The operation of relay 125 opens the circuit of clutch magnet 122 and relay 124 causing both of them to release. The release of magnet 122 throws out the clutch disc 114 which disengages the letter wheel, causing it and the distributor brush 115 to remain at rest in the position at which they were stopped, that is, with the letter H on the periphery of the letter wheel in the sight position and the distributor arm in contact with segment H of the commutator. In the meanwhile, as the letter wheel 116 rotated, gear 129 rotated with it. This gear connects with the type-setting mechanism of the printer (not shown) so that the positioning of the letter wheel of the general type shown in Patent 285,710 simultaneously positions the corresponding printing wheel for the subsequent printing of the first letter designation of the call. The setting of the printing mechanism is accomplished in any suitable manner and hence is neither shown nor further described herein except to mention that, with the operation of relay 125, a path is closed which extends from the printer control terminal T to conductor 130 which, as described hereinafter, loops to other letter and numerical wheel mechanisms in order to complete the printer control circuit when all of the letter and numerical wheels have been set in response to the other perforations of the record.

The letter wheel 116 has now been set to conform with the code registration of the first letter of the called office name and while the shaft 108 continues to revolve after the disengagement of the clutch, the position of this wheel remains undisturbed. A little before the tape record begins to uncover the tracker bar openings with the perforations of the next call record, cam 131 causes contacts 126 to open and unlock multicontact relays 110 and 112 which then release.

Simultaneously with the positioning of letter wheel 116 of the first letter of the office code, all other wheels involving the remaining two letters as well as those comprising the called number and date, are similarly and simultaneously set. Shaft 108 is continuous and carries all the clutch discs for driving other indicating wheels. For the purpose of not encumbering this specification, only those wheel combinations which are electrically or structurally different from the one described will now be described in detail while the others will be briefly indicated.

Figure 2:
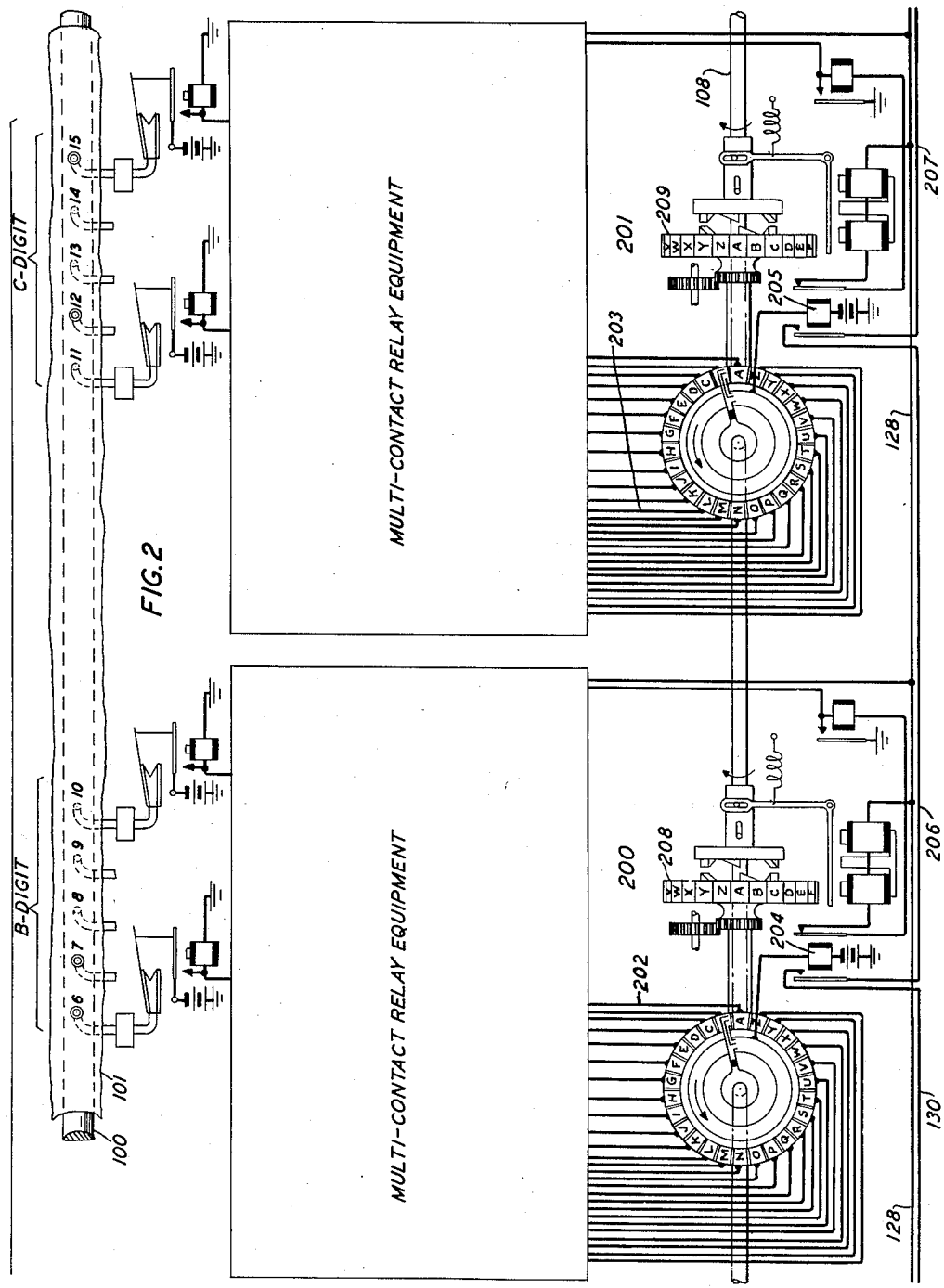

Fig. 2 shows at 200, the letter wheel mechanism for the second letter of the code and at 201 the letter wheel for the third letter of the code. Each of these wheels is set at the same time as letter wheel 116 of the first letter since the perforations of one call record all become aligned over the tracker bar openings simultaneously. Further, since the second letter of the office name is A, the code of which calls for perforations in punch positions 6 and 7, the operation of the multicontact relays (not shown) which are responsive to the operation of the corresponding pneumatics causes a ground to be extended to conductor 202 which, through the operation of relay 204, stops the letter wheel 208 with letter A on its periphery on the sight position. At the same time relay 204 extends the path from the printer motor control terminal T to conductor 206.

In the same way, the letter wheel 209 for the third letter of the code is rotated until the letter L is in the sight position at which time ground on conductor 203, connected thereto by the operation of multicontact relays responsive to the pneumatics which operate in the positions that correspond to punch positions 12 and 15 for the code of the letter L, closes a circuit to operate relay 205 which opens the circuit of the clutch magnet, stops the letter wheel and associated distributor brush from any further rotation and further extends the printer control path to conductor 207. The position of the three wheels, in their sight positions, now display HAL to conform with the directory name of the called office, while the printer types geared to the separate letter wheels are set to the corresponding letter positions.

Figure 3:
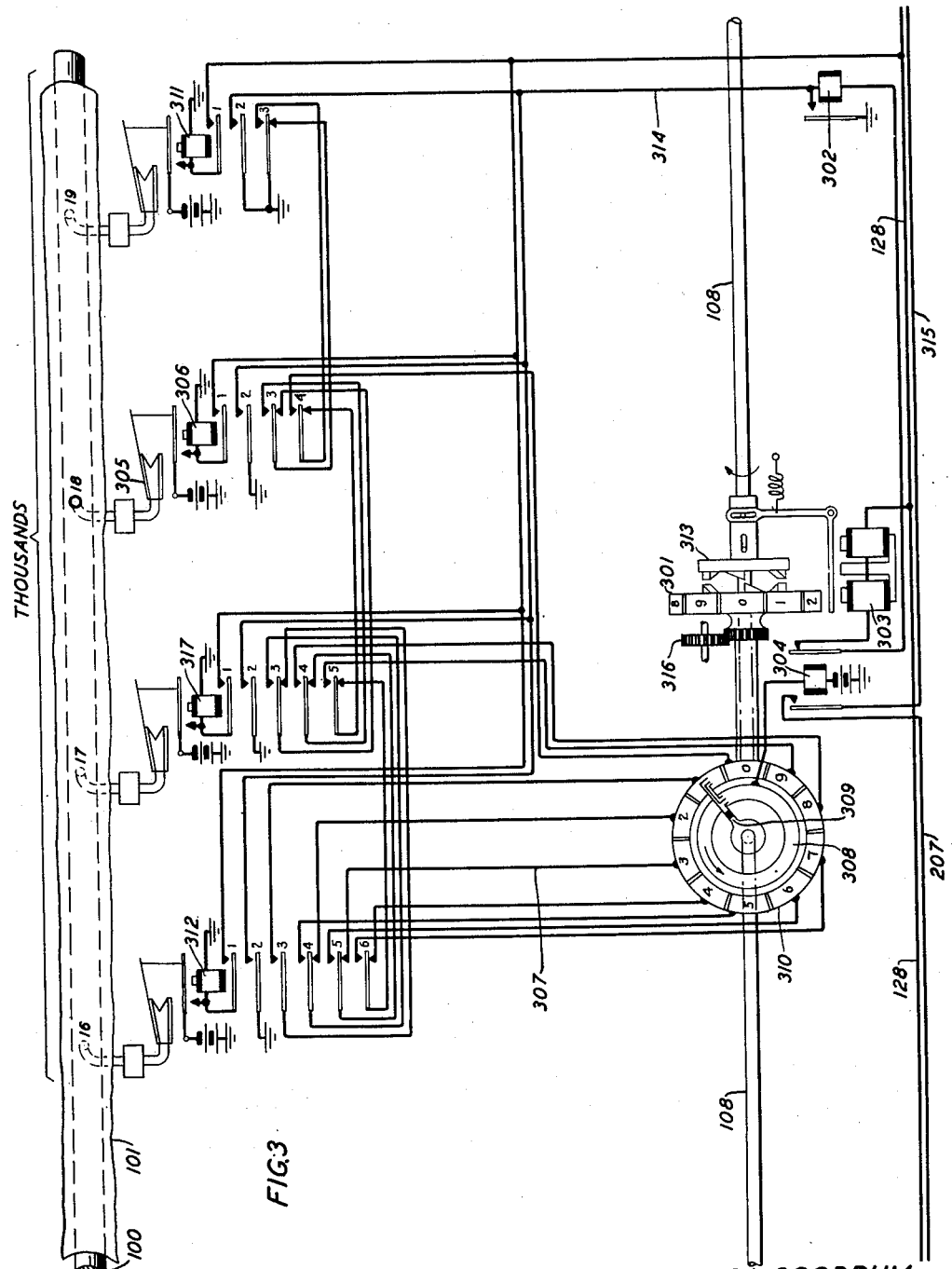
Figure 4:
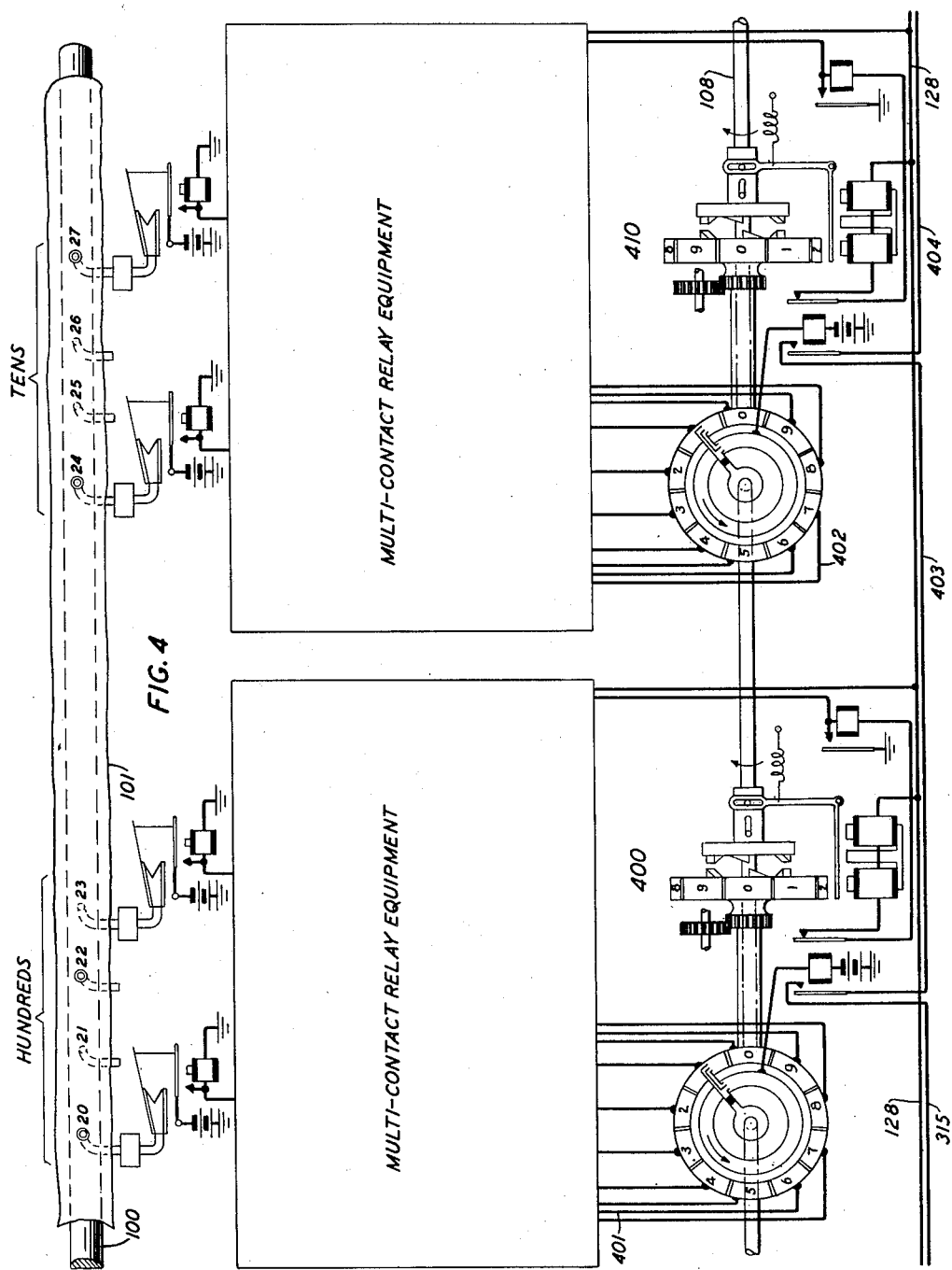

Fig. 3 shows in detail the electromechanical apparatus which controls the setting of the thousands digit wheel. It comprises one multicontact relay for each pneumatic, a numerical wheel 301 with each of the ten digits designations on its periphery, a fixed commutator 310 and the distributor brush 309, all mechanically arranged as the similar combination shown in Fig. 1.

If we assume the number of the called subscriber of any one call record on the tape to be 3678, then when the record advances to the point where the holes punched for the code of the digit 3 become aligned over the tracker bar positions 3, the pneumatic 305 operates in response to a perforation in position 18 for the code of the digit 3. (The code of each of the other digits being apparent by tracing each of the conductors extending to the digital segments of the commutator 310 to ground on one of the relays 312, 317, 306 and 311.) An obvious circuit is closed for relay 306 which, on operating, locks through its No. 1 contact set to grounded battery on conductor 128. A path is further closed which extends from ground over the normal contact of the No. 3 contact set of relay 311, the alternate contact of the No. 3 contact set of relay 306, the normal contact of the No. 4 contact set of relay 317, the normal contact of the No. 5 contact set of relay 312, conductor 307 to segment 3 on commutator 310. At the same time a circuit is closed which extends from ground on the No. 2 contact set of relay 306, conductor 314, winding of relay 302, back contact of relay 304, winding of magnet 303, to grounded battery on conductor 128. Relay 302 operates, locks to ground on its contacts while magnet 303 operates, engages the clutch disc 313 with the number wheel 301 and rotates it until the numeral 3 on its periphery is in the sight position, at which time distributor brush 309 will have been rotated to segment 3, whereupon a circuit is closed which extends from grounded battery through the winding of relay 304, commutator ring 308, distributor brush 309, commutator segment 3, conductor 307 to ground as previously traced thereto. Relay 304 operates, closes another contact in the chain path of the printer control terminal T, opens the circuit of magnet 303 and relay 302 causing the latter to unlock and the former to disengage the clutch disc 313 from wheel 301. As a result, the numerical wheel remains in the place where the numeral 3 appears in the sight position. Just prior to the advance of the tape to the next series of punched holes into alignment over the associated tracker bar holes, cam interrupter 131 breaks contacts 126 whereupon grounded battery is removed from conductor 128 and multicontact relay 306 is released. The tabulator has thus positioned the thousands wheel for the first or thousands digit of the called subscriber's number and the printer has been similarly positioned through gear 316.

Punch positions 20 to 23 control pneumatics which are responsive to the code perforations of the hundreds digit of the called subscriber's number while punch positions 24 to 27 control pneumatics which are responsive to the code perforations of the tens digit of said number. The equipment and controlling circuits which set the corresponding number wheel mechanisms 400 and 410 are the same in both cases as that for the thousands digit already described, and are therefore but diagrammatically indicated in Fig. 4. Since the hundreds digit of the called number is 6, requiring a perforation in punch positions 20 and 22, the operation of the multicontact relays (not shown) which are responsive to the pneumatics in these positions causes ground to be connected to conductor 401 which extends to the sixth segment of the commutator, causing thereby a positioning of the wheel to display the numeral 6. In a substantially similar manner, ground is connected to conductor 402 by the operation of the tens pneumatics when they respond to the code perforations of the digit 7 in punch positions 24 and 27. The printer control path is then extended from conductor 315 over conductor 403 to conductor 404.

Punch positions 28 to 31, and 32 to 35, both inclusive, are responsive, respectively, to the code perforations of the units digit and to those of the station's letter. The equipment and controlling circuits which set the corresponding number wheels 500 and 510 in each of these cases are the same as those for the thousands and hundreds digits and are, therefore, but diagrammatically illustrated in Fig. 5. For setting number wheel mechanism 500, conductor 501 is grounded in response to operations which result from the perforations in positions 29 and 30 for the digit 8. This causes the wheel to be set in the sight position for the digit 8. On the other hand, wheel 501 is not disturbed since it has been assumed that the called number does not have a station's letter.

The pneumatics in Figs. 6 and 7, operative in punch positions 36 to 47, inclusive, are responsive to the perforations of the codes which designate the total money charge for a toll call. Punch positions 36 to 39, inclusive, designate the dollar charges and, through the operation of the control circuits responsive to the operations of the pneumatics in these punch positions, cause the setting of the dollar wheel mechanism 600 to correspond to dollar charge designated by the code perforations in said positions.

Punch positions 40 to 43, inclusive, designate the tenths of a dollar charge and, through the operation of the control circuits responsive to the pneumatics in these punch positions, cause the setting of the tenths of a dollar wheel mechanism 610 to correspond to the tenths of a dollar charge designated by the code perforations in said positions.

Punch positions 44 to 47, inclusive, designate the "cents" charge. In this case, however, only the 0 and the 5 setting is necessary on any particular call since toll calls are only charged for in five-cent increments. Hence the pneumatics responsive to the perforations in these positions respond only to the 0 or 5 code, each response grounding conductor 701 or 702, respectively, for setting the "cents" wheel 700 either to the 0 or to the 5 position.

As already mentioned, the mechanism for printing the toll charges is driven by the three separate gears controlled by the wheels 600, 610 and 700, respectively. This mechanism may take the form of a separate tape wheel of similar construction to the wheels shown and, of necessity, will take the same setting as each of the separate wheels when positioned for a particular toll charge.

It should be noted, however, that, according to the above mentioned patent, if the assumed call is completed within the local area, there will be no perforations on the tape between positions 36 to 47 and also none on the other previously discussed positions reserved for the called office code and number, and also none in positions 48 to 58, inclusive, presently to be discussed. In fact, the only perforations made for a local call are those punched in positions 59 to 64, inclusive, and have to do with the charge codes, in local service units, as explained in the above mentioned patent.

Punch positions 48 to 51, inclusive, shown in Fig. 8, designate the code of the month in which the call was made. The electromechanical equipment which responds to the pneumatic operations in these positions is the same as that previously described for any of the digits of the called number except that the wheel 800 carries twelve indications on its periphery, one for each month of the year, while the commutator 801 is correspondingly divided into twelve segments with a conductor connected to each segment. Each of these conductors extends to a ground connection on one of the multicontact relays which, in turn, operate in the appropriate combinations called for by the following four-unit code, to denote the month in which the call was made:

| Punch positions | Month |
|---|---|
| 48 | January |
| 49 | February |
| 50 | March |
| 51 | April |
| 48, 49 | May |
| 48, 50 | June |
| 48, 51 | July |
| 49, 50 | August |
| 49, 51 | September |
| 50, 51 | October |
| 48, 49, 50 | November |
| 48, 50, 51 | December |

If it is assumed that the call to Halifax 3678 is a toll call and was made on July 17th, holes are punched in positions 48 and 51 in response to the code for this month, whereupon the corresponding pneumatics and multicontact relays operate and ground conductor 805 which, by operations corresponding to those already described, causes the wheel 800 to stop when the designation "July" on its periphery has been revolved to the sight position. Gear 804, turning with wheel 800, sets the printer type to correspond with the month designated by the setting of the wheel 800, while the operation of relay 803 stops the letter wheel from further rotation and advances the printer control path from conductor 703 to conductor 802.

Perforations made between punch positions 52 to 58, inclusive, in Fig. 9, designate the day of the month when the call was made; punch positions 52 to 54, inclusive, designating the tens subdivision of the month and punch positions 55 to 58, the units subdivision. The mechanism shown in Fig. 9 comprises a number wheel 900, a tens commutator 901 with its associated distributor brush 903, and a units commutator 902 with its associated distributor brush 904, the brushes 903 and 904 and wheel 900 being connected by sleeve 926 which is normally loose on shaft 108. The tens commutator is divided into three segments, one for each tens subdivision of the month, and the units commutator into thirty-one segments, one for each day of the month. The first segment of the tens commutator has a circular length equal to that of the first tens subdivisions of the units commutator, the second segment a circular length equal to the second tens subdivisions, while the third segment has a circular segment equal to the last eleven subdivisions. To the first segment is connected conductor 915 which extends to a contact on relay 916; to the second is connected conductor 917 which extends to a contact on relay 907 while to the third segment is connected conductor 918 which extends to a contact on relay 919.

Now the call Halifax 3678 was assumed to have been made on the seventeenth day of the month and the code perforations designating the seventeenth day consist of a hole in position 53, one in position 55 and a third in position 58. Consequently when the perforations of the call record are aligned over the tracker bar openings, pneumatics 929, 905 and 906 operate and, in turn, cause the operation of relays 907, 908 and 909, respectively, over obvious circuits, which relays lock over their respective No. 1 contact sets to grounded battery on conductor 128. Over their respective No. 2 contact sets, ground is applied to conductor 910 which causes a circuit to be closed extending from ground on said conductor, winding of relay 911, back contact of relay 912, winding of clutch magnet 913 to grounded battery on conductor 128. Relay 911 and clutch magnet 913 operate, the former locking through a circuit including its own contacts and the latter throwing the clutch disc into engagement with the numerical wheel 900 thus causing it to rotate with the shaft 108. As the wheel rotates, distributor brushes 903 and 904 sweep over the surface of their respective commutators. Since, however, a circuit over one of the conductors connected to the separate segments of commutator 902 can only be completed by the application of ground to conductor 920, which is done through the operation of relay 914, distributor brush 904 can be effective only in completing the circuit of relay 912 if relay 914 is operated. The circuit of relay 914, however, is completed only when the distributor brush 903 has advanced to the beginning of that segment of the commutator which has grounded battery connected to it. For instance, the call being illustrated, having been made on the seventeenth, and relay 907 having been operated in consequence of the perforation of the code for the tens subdivision of the month, grounded battery is connected to conductor 917. Hence while the distributor brush 903 is on the first segment, that is, while distributor brush 904 is on any one of the first ten segments of its own commutator, relay 914 remains normal. When, however, the shaft rotates to the point where distributor brush 903 makes contact with the second segment, at which time distributor brush 904 makes contact with segment 11, a circuit is closed which extends from ground through the winding of relay 914, commutator ring 928, distributor brush 903, second segment of commutator 901, conductor 917, No. 3 contact set of relay 907 to grounded battery. Relay 914 operates, locks over its right contact to grounded battery on conductor 128 while over its left contact it connects ground to conductor 920. When the shaft rotates to the point where distributor brush 904 engages segment 17 a circuit is completed which extends from grounded battery through the winding of relay 912, commutator ring 921, distributor brush 904, conductor 922, alternate contact of the No. 6 contact set of relay 908, normal contact of the No. 5 contact set of relay 927, the normal contact of the No. 4 contact set of relay 923, the alternate contact of the No. 3 contact set of relay 909, conductor 920, to ground on the left contact of relay 914. Relay 912 operates, extends the printer control path from conductor 802 to conductor 924, opens the circuit of magnet 913 which releases and throws the clutch disc out of engagement with the wheel 900 thereby causing it to come to rest with the numeral 17 on the periphery in the sight position. In the meanwhile, gear 925 has rotated with wheel 900 to set the corresponding printing mechanism for printing the numeral 17.

This concludes the setting of the tabulator for items which are to be printed as a part of a toll call and consisting of the called office code, the numerical designation of the called line, the toll charge in dolars and cents and the date on which the call was made.

As already mentioned, the operation of relay 912 closes another contact of the Printer control path extending this path to conductor 924. This conductor terminates in one contact 1148 of a manual switch 1149. When these contacts are closed the circuit is completed to the Printer control schematically indicated in Fig. 11, from terminal T therein cross-connected to terminal T at the contact of relay 125, thence extended by the operation of relays such as 125 as previously described, through the series circuit above described extending to conductor 924, contacts 1148 and 1149 to the other side of said Printer control equipment. The printing apparatus of the tabulator, having been set in accordance with the setting of the wheels, the printing circuit controlled through the Printer control which includes the platen operating magnets for the toll charges is now operated to cause the various items to be printed in accordance with the indicator wheel and printer settings.

Just before the row of perforations of the next call begins to uncover the tracker bar holes, cam 131 opens contacts 126, the effect of which is to remove battery from conductor 128 unlocking thereby all the relays locked thereto in preparation for the resetting of the wheels for the next call.

In case the record of a call is that of a local call, there are no perforations whatever in any of the punch positions between 1 to 58, inclusive. In this case, the only perforations in the record are those between positions 59 to 64, inclusive, all of which constitute the record, in code form, of the number of local charge units to be assessed for the call. In such an event the only part of the tabulator which is responsive to the perforated record is the integrating local charge computer, diagrammatically illustrated in Figs. 10 and 11.

In order to describe the operation of the integrating computing mechanism which is responsive to the code of a local charge and which further integrates all the local charges appearing on one secondary tape, it will be assumed that the call Halifax 3678 represents a local call for which a charge of eight local service units is to be made. Further, and in order to understand the arrangement of the computing mechanism, it is desirable first of all to indicate briefly what functions are to be accomplished by said mechanism.

According to the most prevalent telephone charge and billing practice with respect to what are known as message rate subscribers, telephone rates in large metropolitan areas are computed on the basis of an allowable defined maximum number of local calls for a given billing period and for a stipulated minimum charge. Beyond this defined number of local calls, the remaining local service charges are computed at a rate per unit which diminishes with the total units used. For instance, subscribers may be allowed a maximum of sixty-five calls per month for a certain monthly charge of, say, $4.00 a month. The next one-hundred calls may be charged at the rate of five cents each, the next hundred after that at four and one-half cents, the next hundred at four cents and next hundred at three and one-half cents. Therefore, the integratnig mechanism of the printing tabulator which controls the associated printing apparatus for printing the total local charges for a billing period must be responsive to the several discriminations in the rate structure. Hence the computing mechanism disclosed in this specification for adaptation to the commercial printing tabulator is arranged to (1) add up the required number of local charges that correspond to the number allowed over the billing period for the contracted minimum billing charge; (2) eliminate these charges from any further consideration since the charge for these calls is, presumably, a part of the printed bill-form; (3) to add up the required number of calls beyond the allowed maximum, compute the charge at the prescribed rate for each given number of calls at the prescribed rates, and then cause the printing mechanism to print the total charges so computed.

Referring now to Figs. 10 and 11, it will be seen that there are four commutators, viz., 1022, 1014, 1023 and 1034. To the segments of commutator 1014 are connected the marking conductors which extend to the contacts of the relays 1005, 1049, 1050, and 1051. These relays operate in response to the operation of the pneumatics controlled by the perforations of the units digit code of the total charge for a call. The ground to any of these conductors is controlled through the left back contact of relay 1101 by way of conductor 1100 and further controlled over contacts of the relays above mentioned, so that when these relays operate, either singly or in combination in response to the units code of a local charge, ground is extended to any one of these conductors.

The wiring organization of the pneumatically controlled units multicontact relays is identical with that of the pneumatically controlled relays shown in Fig. 3 and therefore is not shown in detail. Commutator 1023 is the tens commutator. Since, in the present embodiment of the whole invention as disclosed in the parent patent above-identified, the rate structure assumed limits the maximum number of local charges for the longest local call to 14, there is but one conductor extending from the tens multicontact relay 1062 through the back contacts of relay 1101 to the number 1 segment of commutator 1023.

In this connection it will be observed that two punch positions 59 and 60 on the tracker bar are reserved for the tens designation of the local charges, and two pneumatics 1002 and 1003 are provided to respond to corresponding perforations on the tape. However, inasmuch as the disclosure of the present embodiment of the invention is predicated upon the assumption that the total local charge units for any one call is fourteen, it is only necessary, as described hereunder to provide but one signal to indicate the difference between a call having less than ten charge units and one having more. A perforation in position 59, for instance, indicates that the total charge units for the call is less than ten while a perforation in position 60 indicates that the total local charge unit is more than ten but less than twenty. Should it be necessary to modify the mechanism to indicate a greater number of charges, say more than twenty but less than thirty, both perforations could be utilized to give this indication and the pneumatic equipment responding thereto and the electromechanical equipment controlled thereby could easily be modified to provide a corresponding control of the call recording apparatus whose number of revolutions, in registering the total call units for any call, depends, of course, upon the maximum total for which the equipment is designed. In the description which follows, therefore, no use is made of pneumatic 1002 which operates when the total charge units is less than ten but pneumatic 1003 is utilized when it responds to a perforation in position 60 to indicate a total charge units of more than ten but less than twenty. The perforation in position 59 and the equipment responding thereto have been disclosed in the present embodiment of the invention to show the ease with which the invention may be modified and expanded to include a record of as many local charge units as desired, it being evident that position 59 can be combined with position 60 and with other positions if necessary to give the record of the number of charges.

Commutator 1022 is a feeding mechanism and its relation to the rest of the computing apparatus will become apparent from the description of the operation which follows.

Assume, first, that the number of local charge units to be assessed for the call is eight. Since the total of these charges is less than ten, pneumatic 1002 is operated in punch position 59 although, as already explained, it performs no useful function. The units pneumatics 1053 and 1048 operate in response to the code perforations in punch positions 62 and 63, respectively, for the units digit 8 causing thereby the operation of relays 1050 and 1049 which lock to grounded battery on conductor 128 in the same manner as the operation and locking of previously described pneumatically responsive multicontact relays. Therefore a path is extended from ground on the left back contacts of relay 1101, conductor 1100, through a normal contact of relay 1005, alternate contacts of relays 1049 and 1050 and a normal contact of relay 1051, (not shown) conductor 1006 to segment 8 of commutator 1014. In the meanwhile the operation of relays 1049 and 1050 further closes a circuit from ground on contacts 1110 which are controlled by cam 1108 carried by or geared to the record tape take-up roll and timed to close contacts 1110 when the perforations are fully aligned over the tracker bar openings and slightly beyond, left contact of relay 1109, conductor 1113, contacts of relay 1049 or 1050, conductor 1112, right outer back contact of relay 1101, right back contact of relay 1111, conductor 1114, winding of start magnet 1013 to grounded battery. Now commutators 1014 and 1022 are fixed but their respective distributor brushes 1015 and 1020, which occupy relatively similar positions on their respective commutators, are keyed to the shaft 1019 which further engages with main shaft 108 through friction clutch 1018. Shaft 1019 also carries gear 1016 which is permanently meshed with gear 1017. When, therefore, magnet 1013 operates by the closure of the above circuit and the stop controlled thereby is raised, the shaft 1019 is freed to be driven by the friction clutch 1018. Both distributor brushes begin to revolve with the shaft 1019 away from their normal segments, brush 1020 moving from its normal segment 1061 and brush 1015 moving from the No. 10 or normal segment while gear 1016 also revolves and causes the rotation of gear 1017 which at this time, however, performs no useful function. Also, the distributor brush 1020, in rotating to its off-normal its segment 1021 completes a circuit for relay 1111 which extends from grounded battery through the winding of said relay, conductor 1115, outer ring of the commutator 1022, distributor brush 1020, inner ring of said commutator, to ground. Relay 1111 operates and, through its inner front contact, connects shunt ground to one side of the winding of relay 1101. When distributor brush 1020 reaches its normal segment 1061 the shunt is removed causing relay 1101 to operate in series with relay 1111 and perform functions noted hereinafter. The circuit path for relay 1101 is traced from battery through the winding of relay 1111, right inner contacts of said relay, winding of relay 1101 to ground through the right contacts of relay 1109. Relay 1111 also prepares a locking path for relay 1119 which operates as hereinafter described. At its left contact, relay 1111 opens the feed control circuit of device 1107 to arrest the advance of the tape until the record of the call has been tabulated. At its right outer back contact relay 1111 opens the circuit of start magnet 1013 thereby causing the release of said magnet which is then in a position to re-engage the stop latch of shaft 1019 at the end of one revolution of shaft 1019.

When the distributor brush 1015, in the course of its rotation, reaches segment 8, the ground connected thereto by conductor 1006 completes a circuit through the distributor brush and commutator feed, winding of clutch magnet 1037 to grounded battery, and in parallel therewith over conductor 1027, winding of relay 1119 to grounded battery. Relay 1119 operates and locks over the right back contact of relay 1109 to ground thus locking magnet 1037 in its operated position. Magnet 1037 causes the disc of clutch 1025 to engage the disc on the shaft of gear 1026. This gear now rotates and causes the rotation of gear 1028 which is permanently meshed with it. Gear 1026, being now mechanically coupled to shaft 1019 rotates in unison with the distributor brushes 1015 and 1020.

It will be observed that distributor brush 1015 sweeps past two segments of the commutator before it contacts with segment 8, and that after passing this segment, ground is removed from the circuit of clutch magnet 1037. The magnet, however, does not release at this time it being held over the ground that locks relay 1119, the clutch disc 1025 remaining engaged with the gear 1026 and making eight-tenths of a revolution by the time the distributor brush 1015 has rotated past segment 1.

It is further to be noted that when gear wheel 1026 makes one complete revolution for every complete revolution of the distributor brushes 1015 and 1020, gear wheel 1028 which has a reduction gear ratio with respect to gear wheel 1026, will make one tenth of a revolution equaling one-tenth of the monthly local calls allotted for the stipulated monthly rate. For instance, if the number of local charges allowed per month were to be 100 then the ratio of gear 1028 to gear 1026 would be 10 to 1. Hence, if the call being registered represents a charge of eight local service units, gear 1026 revolves eight-tenths of a revolution and gear 1028 revolves eight one-hundredths of a revolution in the registration of the eight call charges.

When the distributor brush 1020 has made one complete revolution and again engages its normal segment, the short circuit around the winding of relay 1101 is removed, causing said relay to operate in series with relay 1111 as already described. At its left front contact, relay 1101 closes an obvious circuit for relay 1109 which opens the locking circuit of relay 1119 and that of clutch magnet 1037 whereupon said magnet releases and disengages the clutch 1025, causing both gears 1026 and 1028 to remain in the position to which they were advanced. Relay 1109 also opens the locking circuit of relay 1111 and that of relay 1101 causing both of these relays to release. Relay 1111, upon releasing, recloses the feed control circuit 1107 which causes the tape record to be advanced to the next row of perforations, releases relay 1101 which, in turn, opens the circuit of relay 1109 which is slow release. When the take-up roll, subsequent to the reclosure of the feed control circuit 1107, has turned a quarter of a revolution, contacts 1110 are opened. Relay 1109, however, is sufficiently slow in releasing that it will not reclose its contacts until contacts 1110 have been opened, so as to preclude the possibility of again completing the circuit of start magnet 1013 through the contacts of said relay.

A little before the next row of perforations begins to expose the associated tracker bar openings to the atmosphere, contacts 126 are opened, thereby removing battery from conductor 128 and causing relays 1049 and 1050 to unlock and restore.

The entire mechanism is now normal with the exception of gear 1028 which remains in the position to which it was rotated to record the eight local charges for the particular call.

The cycle of operations indicated by the above example may be graphically depicted by the timing chart shown in Fig. 12, in which the operation of certain elements of the mechanism is given in terms of the revolution of the take-up roll, which causes cams 131 and 1108 to function contacts 126 and 1110, respectively, and in terms of the revolution of brush 1020 and shaft 1019 which rotate to function the mechanism to tabulate the number of call units and charges therefor indicated by a series of perforations in the record tape sensed by the tens and units pneumatics. Each revolution or cycle of the take-up roll is considered as 360 degrees, during which time the record tape is advanced from one row of perforations in complete alignment over the holes of the tracker bar to the next row of perforations which likewise will be in complete alignment over the holes of the tracker bar. A cycle, then, may be assumed to start from 0 degrees when a row of perforations is aligned over the holes of the tracker bar, at which time contacts 126 and 1110 are closed.

The collapse of pneumatics 1053 and 1048 in response to perforations in positions 62 and 63 (for the units digit 8, for example) of the record tape will cause the energization of relays 1049 and 1050, said relays then locking over conductor 128 to battery on contacts 126. The total time consumed by these operations will be approximately 5 degrees in terms of the rotation of the take-up roll so that, 5 degrees beyond the 0 degree point or start of the cycle, relays 1049 and 1050 (the two units pneumatic relays involved for the units digit 8) will be energized and will remain energized until their locking circuit is opened by contacts 126 which, opening momentarily just before the perforations of the next row of perforations becomes aligned over the tracker bar holes, may be assumed to open at 340 degrees and reclose at 350 degrees of the same cycle.

As already explained, the energization of the units pneumatic relays will cause a circuit to start magnet 1013 to be completed which, allowing for electrical and mechanical lag, will set shaft 1019 and brush 1020 affixed thereto in rotation by the time the take-up roll has rotated to its 15-degree position. Since magnet 1013 controls a one-revolution clutch 1018, shaft 1019 and brush 1020 would, if the rotation of the take-up roll were to be uninterrupted, complete their revolution by the time said shaft will have reached the 15-degree position in the next cycle.

Brush 1020 is shown as resting in the center of segment 1061 which is approximately 30 degrees in extent and, therefore, brush 1020 must move at least 15 degrees before engaging segment 1021. However, brush 1020 does not begin to rotate until clutch 1018 is released, which occurs 15 degrees after the beginning of the first revolution of the take-up roll. Hence brush 1020 engages segment 1021 at the 30-degree point in the revolution of said roll, but at the 15-degree point in its own revolution, at which time the circuit of relay 1111 is completed as described. Allowing 5 degrees for the operation of this relay and 10 degrees for a slight overrun of the feed control mechanism 1107, the record tape will come to rest at 45 degrees, by which time the row of perforations will have been advanced well past the tracker bar holes to cause restoration of the operated pneumatics. Contacts 1110, however, are still closed, the same not opening until the take-up roll has rotated through a quarter of a revolution, that is, until it reaches the 90-degree position.

Now while the record tape is held, due to the stopping of the feed control 1107 by the interruption of the latter's circuit at the left contacts of relay 1111, the take-up roll is, of course, similarly stopped, leaving both contacts 126 and 1110 closed. Further, while the record tape remains in the position to which it is advanced by the time the tape-up roll reaches the 45-degree point, shaft 1019 with brushes 1020 and 1015 mounted thereon, will complete its revolution (shown on the lower scale of the chart) and all tape record movements are suspended until the termination thereof; that is, until relay 1111 is released and the circuit of the feed control 1107 reclosed.

The operation of shaft 1019 during the suspension of the rotation of the take-up roll when it reaches its 45-degree position, is illustrated, in Fig. 12, by the gap indicated in the timing functions dependent upon the rotation of the take-up roll and by the timing functions dependent upon the rotation of shaft 1019, the latter being shown on the lower scale of the figure. In this lower scale, the zero or start of the cycle of shaft 1019 is at the 15-degree point of the cycle of the take-up roll, and relay 1111 which is energized at the 30-degree point in the cycle of the take-up roll appears as being energized at the 15-degree point in the cycle of shaft 1019. Since shaft 1019 begins to rotate at the 15-degree point in the cycle of the take-up roll, and the latter stops rotating at the 45-degree point while shaft 1019 continues to rotate therebeyond for the remainder of its revolution, a space is introduced beginning at the 45-degree point in the rotation of the take-up roll and ending at the termination of the revolution (or revolutions) of shaft 1019 which indicates the interval during which the take-up roll is stopped.

When brush 1020 leaves segment 1021 at the 345-degree point in the cycle of shaft 1019, the short circuit around the winding of relay 1101 is removed, causing said relay to operate in series with relay 1111 to ground on the right contacts of relay 1109, as already described, and relay 1101 closes an obvious circuit for relay 1109 which, upon operating, opens the circuit of relays 1111, 1109 and 1101 causing them all to release, relay 1111 reclosing the circuit of feed control 1107 at 347 degrees and causing thereby its operation to restart the movement of the record tape across the tracker bar openings so as to bring the next series of perforations over the holes thereof. During the passage of the tape, the pneumatic relays remain locked to battery on contacts 126, which do not open until the take-up roll advances to the 340-degree point in its revolution, causing said relays to release at, say, 342 degrees. However, since contacts 1110 are closed only until the 90-degree position is reached, no circuit is available for reoperating start magnet 1013 between this point and the time the pneumatic relays release towards the end of the revolution, so that shaft 1019 and brushes 1020 and 1015 mounted thereon remain stationary, the latter on their respective normal segments. The succeeding revolutions of the take-up roll, therefore, cause the above operations to be repeated substantially as above described.

It will now be assumed that the call which is to be registered contains more than ten local unit charges, say fourteen, as would be the case, for instance, in a connection between two offices for a twenty-seven minute conversation for which the base rate is fifteen cents for five minutes and the overtime rate is five cents for each additional two minutes or fraction thereof. In this case the units pneumatic 1004 operates in response to the perforation in punch position 64 of the units digit code and further operates relay 1005 which closes the previously traced circuit for start magnet 1013 for starting the rotation of shaft 1019. As soon as commutator brush 1020 moves off normal, relay 1111 operates as before and locks through the winding of relay 1101 to ground at the right back contact of relay 1109 after brush 1020 leaves the off-normal segment, as pointed out before. Relay 1101, being shunted, does not operate. When the commutator brush 1015 engages segment 4 of commutator 1014 with units relay 1005 operated, relay 1119 and magnet 1037 operate in parallel as before, and during the remainder of the first revolution of shaft 1019, gear 1028 is advanced four one-hundredths of a revolution. Relay 1111, upon operating, opens the initial operating circuit of start magnet 1013 but this magnet does not release in this case because of an alternate operating circuit to be presently described. Relay 1111 at its left contact has also opened the circuit of feed control 1107 to arrest the further advance of the tape record while the pneumatic relays, in the present case relays 1005 and 1009, remain locked to battery on conductor 128 due to the continued closure of contacts 126.

In the meantime, pneumatic 1003 which operated at the same time as pneumatic 1004 under the assumption that the number of charges to be made is more than ten, has caused the operation and locking of relay 1062 which, upon operating, closed a circuit extending from ground over its inner contact, conductor 1007, inner back contact of relay 1101, conductor 1116, winding of clutch magnet 1052 to grounded battery, and in parallel therewith through the back contact of relay 1127, winding of relay 1128 to grounded battery. Relay 1128 operates and closes a supplementary circuit for start magnet 1013 over conductor 1114, the right contact of relay 1128, outer right back contact of relay 1101, conductor 1112 a set of contacts on one of the operated units pneumatic relays, conductor 1113, left contacts of relay 1109, to ground on contacts 1110. At its left contact relay 1128 closes a supplemental shunt around the winding of relay 1101 which is effective to hold relay 1101 unoperated when brush 1020 reaches normal, this circuit extending from ground over brush 1020, segment 1061 of commutator 1022, conductor 1120, left contact of relay 1128, inner front contact of relay 1111, winding of relay 1101 to ground at the right back contact of relay 1109. Thus on a call involving more than ten charge units, relay 1128 is effective to prevent the stopping of shaft 1019 at the end of its first revolution and to prevent the operation of relay 1101 which would otherwise operate at the end of said first revolution to release clutch magnet 1037. Shaft 1019 therefore continues to rotate through a second complete revolution, driving gear wheel 1028 an additional ten one-hundredths of a revolution. The timing relations between the take-up roll and shaft 1019 are shown in the second cycle of Fig. 12.

At the time relay 1128 operated in response to the operation of the tens relay 1062, clutch magnet 1052 operated in parallel therewith over conductor 1116 thereby moving clutch disc 1035, slidably keyed to auxiliary shaft 1008, into engagement with gear wheel 1017. Thus during the first revolution of shaft 1019 as previously described, shaft 1008 is also rotated, thereby rotating distributor brush 1024 over the segments of commutator 1023. Since the gear ratio between gear 1016 on driving shaft 1019 and gear 1017 is assumed to be 1 to 11, the distributor brush 1024 makes one-eleventh of a revolution during the first revolution of shaft 1019 and will have been positioned on the No. 1 segment of commutator 1023 at the time that distributor brush 1020 on shaft 1019 moves off the normal segment 1061 at the beginning of the second revolution of shaft 1019. Consequently with tens relay 1062 operated, a circuit is then closed from grounded battery, winding of relay 1127, conductor 1010, distributor brush 1024 and the No. 1 segment of commutator 1023, middle front contact of relay 1062, conductor 1117, middle right back contact of relay 1101, conductor 1029, off-normal segment of commutator 1022, brush 1020 to ground. Relay 1127 operates and locks itself in parallel with the winding of clutch magnet 1052 over the inner right back contact of relay 1101, conductor 1007 to ground at the inner front contact of relay 1009 and, at its back contact, opens the circuit of relay 1128. Relay 1128 upon releasing (it being slow release for the same reason that relay 1109 is slow release), releases start magnet 1013 in order to stop the rotation of shaft 1019 after it has completed its second revolution and, at its left contact, opens one shunt around the winding of relay 1101. When the shaft 1019 has completed its second revolution and the remaining shunt around relay 1101 over conductor 1115 is removed at the time when distributor brush 1020 leaves off-normal segment 1021, relay 1101 operates thereby releasing relay 1127 and clutch magnet 1052. Relay 1101 at its left front contact closes the circuit of relay 1109 which operates thereby releasing relays 1119, 1101 and 1111 and clutch magnet 1037. Relay 1101 upon releasing releases relay 1109. When relay 1111 releases, the feed control 1107 again operates to advance the tape record to the next row of perforations, releasing the operated pneumatic relays near the end of the revolution of the take-up roll in sequen . of the opening of contacts 126. When clutch magnet 1052 releases, the distributor brush 1024 is moved back to its normal position by a torsion spring which was tensioned during the advance movement of brush 1024, one end of the spring being attached to the auxiliary shaft 1008 and the other end to the frame of the mechanism.

The mechanism is now in condition to be reoperated in accordance with the record of the next succeeding call on the record tape.

The gear wheel 1028 has thus been advanced four one-hundredths of a revolution during the first revolution of shaft 1019 and ten one-hundredths of a revolution during the second revolution of shaft 1019 or a total of fourteen one-hundredths of a revolution, indicative of fourteen call unit charges for the local call just considered. It remains in this position following the release of clutch magnet 1037.

Having described the operation of the computing mechanism for the registration of the total local service units for one call, we will now proceed to describe its further operation with respect to the registration and integration of call charges beyond the maximum allowed, and at a rate which diminishes as the number of units increase.

Let it be assumed that the rate structure allows a subscriber 100 calls for the regular monthly charge, an additional 100 calls at the rate of five cents each, the next 100 calls at four and one-half cents, the next 100 calls at four cents and the next 100 calls after that at three and one-half cents. As already stated, the integrating gear 1028 is calculated to make one revolution for the maximum number of calls allowed for the monthly rate. This gear is keyed to a shaft on which is also keyed the gear 1032 which, in turn, meshes with a larger gear 1033 that, in accordance with the rate structure assumed, bears the ratio of 5 to 1 with the gear 1032. The gear 1033, on the other hand, is keyed to a shaft that carries distributor brush 1036 which engages with a commutator 1034 having as many segments as there are different rates. For the rate structure assumed, there would be five segments including a segment for the fixed charge rate cared for in the monthly charge contract.

To the shaft which carries gear 1026 there is slidably connected one member of a clutch 1045 controlled through clutch magnet 1044 which is capable of engaging shaft 1011 with shaft 1019. The shaft 1011 is arranged to drive call units counter 1060 capable of adding up to 10,000, gear 1054 meshing with gear 1012, and gear 1142 meshing with gear 1129, the latter two gears having a unity ratio. Gear 1129 is keyed to shaft 1126 on which are also slidably keyed clutch discs 1133, 1152, 1153 and 1154. These clutch discs may be engaged, respectively, with gears 1134, 1135, 1136 and 1137 all of which may be made to rotate with shaft 1011 through the operation of the respective clutch magnets 1131, 1141, 1147 and 1143 to drive the integrating gears 1121, 1122, 1123 and 1124 keyed to shaft 1155. Shaft 1155 also drives the money charge counter 1140 and positions the printing mechanism through the rotation of gear 1118 in mesh with gear 1125.

If it be assumed that throughout one billing period a number of local calls are made which, so far as the total charge is concerned, can be represented as the equivalent of 500 local service charge units, then these calls are all recorded on the secondary tape. When the tape is run through the tabulator, all these local charge units are entered in the computer mechanism in the manner described above; that is to say, by the operation of the gears 1026 and 1016, respectively, and the integrating gear 1028. As this last-mentioned gear turns in adding successive local charges, gear 1032 which is carried by the same shaft causes gear 1033 also to revolve one-fifth of a revolution for each revolution of gear 1032 and hence for one revolution of gear 1028. But one revolution of gear 1032 is the equivalent of ten revolutions of gear 1026 which latter, in turn, rotates ten times in response to 100 local service units. It has been further assumed that 100 local service units is the maximum number of calls allowed the subscriber for the contracted monthly charge. Hence when gear 1028 has completed one revolution, the contracted 100 local service units have been properly counted and gear 1033 will have been advanced one-fifth of a revolution. Since these calls do not enter into the printing of that part of the bill which is controlled by the tabulator, neither the call units counter 1060 nor the money charge counter 1140 are in any way affected. The counters 1060 and 1140 may be of the well-known type such as is disclosed, for example, in Patent 1,459,425, granted June 19, 1923, to C. H. Wheeler.

When gear 1028 completes the one revolution by which the contracted local service units are counted and gear 1033 has rotated one-fifth of a revolution, its associated distributor brush 1036 will have rotated past the normal segment of commutator 1034 and will be making contact with segment 1030. A circuit is now completed for relay 1130 which extends from ground over distributor brush 1036, segment 1030, conductor 1031, winding of relay 1130 to grounded battery. Relay 1130 operates, locks to ground on contacts 1155 which are closed until the record tape has been entirely fed through, and further closes a circuit extending from grounded battery through the winding of clutch magnet 1131, back contacts of relay 1132, right outer contact of relay 1130 to ground at contacts 1155. Through its inner right contact, relay 1130 extends the circuit of the gear clutch magnet 1037 in parallel with the winding of magnet 1044. This latter magnet engages the clutch 1045 to couple shaft 1011 for rotation with shaft 1019. Hence, after the contracted local charges for the month are properly counted, the next charges thereafter to be entered in the computing mechanism will cause magnet 1044 to operate in parallel with magnet 1037 to engage clutch 1045 and cause thereby the rotation of the call units counter 1060 through shaft 1011 in the well-known manner to count up all local charge units beyond the contracted number. Through gear 1012, the printing mechanisms are simultaneously set. The revolution of shaft 1011 also causes the rotation of the various rate gears as described hereinafter.

It will be remembered that the 100 local charges immediately following the maximum monthly allowance are assumed to be at the rate of five cents each. That is, when gear 1028 has completed one revolution the charge rate changes and actual computations begin in the computing mechanism. It will be further recalled that the circuit of magnet 1044, controlling the clutch mechanism 1045 and that of magnet 1131 controlling clutch 1133, have been closed as already described. Consequently when clutch 1045 couples shaft 1011 to shaft 1019, gear 1142, through gear 1129, revolves shaft 1126 and the coupling of clutch disc 1133 with its cooperating gear 1134 causes the rotation of gear 1121. Gear 1134 bears a ratio of 5 to 10 with its driven gear 1121 so that each revolution of the latter is the equivalent of twenty calls at five cents each. Since the money charge counter 1140 is driven by shaft 1155, it follows that at each revolution of gear 1121 the right outside wheel of money charge counter 1140 is rotated one complete revolution to register one dollar. With five revolutions for counting the total of 100 calls, the total charge that will be registered will be five dollars, each revolution of the outside wheel being recorded by the advance of the middle wheel through the intermediate gear shown between the two wheels to record one dollar and each revolution of the middle wheel being recorded by the advance of the left outside wheel through the intermediate gear shown between the last two wheels mentioned to record ten dollars. Through gears 1118 and 1125 the printing type mechanism which may be of the same type and construction as mechanism 1140 except that the numerical characters on the periphery thereof are raised to permit the platen to ink the surface of said characters for printing purposes, is correspondingly set.

When 100 calls at the five-cent rate have thus been recorded, gear 1028 will have made another revolution and gear 1034 will have been advanced another fifth of a revolution. But the second advance of this latter gear will have brought distributor arm 1036 in contact with segment 1038 and a circuit is thereby closed extending from ground on said segment, winding of relay 1132 to grounded battery. Relay 1132 operates, locks to ground at contacts 1155 and, over its right front contact, further closes a circuit which extends from ground at contacts 1155, right outer contact of relay 1130, right front contact of relay 1132, right back contact of relay 1139, winding of magnet 1141 to grounded battery. Relay 1132 also opens the previously traced circuit for magnet 1131 which releases. Magnet 1141 operates and throws in its cooperating clutch disc 1152 to engage gear wheel 1135 whose ratio with its driven gear 1122 is 4½ to 10. This indicates that the local service units which have been charged at five cents per unit have been exhausted and that the rate is to be changed. Since gear 1135 bears a 4½ to 10 ratio with its gear 1122 then one revolution of gear 1135, which represents the registration of ten charge units, will have caused nine-twentieths of a revolution of gear 1122. But since one revolution of gear 1134 causes an advance of the money charge counter 1140 involving an amount of rotation equivalent to fifty cents, then one revolution of gear 1135, likewise representing ten charge units, will cause an advance of said counter to add forty-five cents to the total.

Ten revolutions of the gear 1026, one revolution of gear 1028, another fifth of a revolution of gear 1033 and the ten consequent revolutions of gear 1135 mark the full registration of 100 call charge units at four and one-half cents per unit causing the money charge counter 1140 to register an additional charge of four dollars and fifty cents or a total of nine dollars and fifty cents and causes a corresponding advance of the printing mechanism, while the 100 calls at this rate are counted on call units counter 1060 in the same manner as the previous 100 calls at five cents were counted thereon. Hence, when the distributor brush 1036 has advanced to segment 1039 which occurs on the third full revolution of gear 1028, a circuit is closed which extends from ground on segment 1039, winding of relay 1139 to grounded battery. Relay 1139 operates locks to ground on contacts 1155, opens the circuit of magnet 1141 and closes that of magnet 1147 by way of ground at contact 1155, right outer front contact of relay 1130, front contacts of relays 1132 and 1139, back contact of relay 1138, winding of magnet 1147, to grounded battery. Magnet 1147 upon operating, engages clutch disc 1153 with gear 1136 so that upon the advance of the tape to record the next group of 100 calls, gear 1136 is rotated. This gear bears a 4 to 10 ratio with gear 1123. Therefore, each revolution of the shaft 1011, in response to the addition of ten local charge units, causes gear 1136 to make one revolution and gear 1123 to make four-tenths of a revolution, causing thereby a corresponding advance of the money charge counter 1140 to add forty cents to the total for each ten call charge units and a corresponding setting of the printer type mechanism. When the additional 100 call units have been received and caused thereby the operation of the computing mechanism as already described, gear 1028 will have made four revolutions, gear 1033 will have been advanced four-fifths of a revolution, the call units counter 1060 will indicate a total of 300 calls, the money charge counter 1140 will indicate a total charge of thirteen dollars and fifty cents and the printing type mechanism, controlled through gear 1125, will have been set to print this amount.

Following the entering of the first 300 call units, the distributor brush 1036 will make contact with segment 1047 whereupon a circuit is completed extending from ground on said commutator segment, distributor brush 1036, winding of relay 1138 to grounded battery. Relay 1138 operates, locks to ground on contacts 1155, opens the circuit of magnet 1147 and closes that of magnet 1143, which circuit extends from ground on contacts 1155, right outer contact of relay 1130, front contacts of relays 1132, 1139 and 1138, winding of magnet 1143 to grounded battery. Magnet 1143 operates and causes the engagement of clutch disc 1154 with the gear 1137 meshed to gear 1124. Gear 1137 has a ratio of 3½ to 10 with respect to gear 1124. Consequently, one revolution of gear 1137 which registers a receipt of ten local charge units causes thirty-five one-hundredths of a revolution of gear 1124 and a similar rotation of the money charge counter 1140 which will advance to register thirty-five cents for the registration of each of the ten local charge units. For 100 calls at this rate, the money charge counter 1140 adds three dollars and fifty cents. At this time, call units counter 1060 will indicate 400 calls, the money charge counter 1140 will indicate a total charge of seventeen dollars and the printing type mechanism will have been set to print this amount. Distributor brush 1036 will now rest on its normal segment again.

The information thus prepared for the printing mechanism by the computing tabulator will thus, through gears 1054 and 1012, set the printing mechanism to print 400 as the total number of calls made in excess of the 100 calls allowed at the flat rate, as indicated by the call units counter 1060 and to print a total charge of seventeen dollars therefor as indicated by the money charge counter 1140.

The mechanism of the computing tabulator as disclosed has been arranged, of course, to illustrate the principle by which the gearing equipment and the controlling circuits can be arranged for a specific rate structure and bulk billing discounts. When the number of local charge units exceeds 400 beyond the contracted number of such units for a given monthly period, and lower rates are to be furnished for additional calls, it is believed that the principle of the arrangement of the computing tabulator as above described will easily furnish one skilled in the art with the means of expanding the equipment and modifying the controlling circuits to accord with further and additional rates.

The setting of the printing mechanism through gears 1054, 1012 and 1118, 1125 has been briefly indicated but may be accomplished by any suitable means. The printing mechanism in itself may comprise a number of printing wheels of similar construction to the number and letter wheels illustrated in various drawings, further shown in Fig. 1 of Patent 1,881,585 and set substantially in the manner shown therein, except for the difference in motive power. Being rotated by the gears mentioned, they will, of course, take an identical setting with said wheels when positioned in the manner indicated. That portion of the printing mechanism which is set to print the number of local charge units and the total amount of these charges may be, as said before, of similar construction to the call units counter 1060 and the money charge counter 1140, respectively.

At the termination of the record analysis, manual switch 1149 is operated. This switch is the medium through which, when the center blade is in contact with the lower spring, closes the circuit of the toll charge platen operating magnets (not shown) controlled through the printing control in Fig. 11 and further completed through the closure of the series path in each of the components of the toll setting equipment of Figs. 1-9, inclusive, which have taken a setting in response to the perforations of a toll call. When the center blade of the switch is in engagement with its upper spring, as it should be for printing the total of the local charge units after the record has been completely analyzed, the circuit of the local platen operating magnets is closed through said upper spring and through these magnets (not shown) back to the Printer control unit of Fig. 11. As previously mentioned, switch 1149 is normally in its down position and causes the printing of the toll charge for every toll call analyzed since the printing control circuit is completed through the lower contacts of switch 1149 and conductor 924, after which the tape is advanced to the next call record where, if the call is a toll call, the operations are repeated and where, if the call is local, the call unit charges are recorded in the position of the various gears of Fig. 11 as already explained. The total of the local charges is printed but once and it is done after the entire tape has been analyzed subsequent to which switch 1149 is operated to engage its center blade with its upper spring for the completion of the local platen operating magnets circuit. This means that the toll charge of every toll call is printed as each such call is analyzed whereas only the total of all call units subsequent to the analysis of the entire tape is printed.

When the printing is accomplished, switch 1149 is again depressed against its lower spring in readiness to record individual toll calls of another record tape.

It will be recalled that the secondary tape 101 which is passed through the tabulator mechanism has preliminary perforations therein indicative of the calling line directory number and that these perforations were made therein as a result of the passage of a master record through the translator completely shown and described in said parent application. Thus, prior to the operations of the tabulator mechanism in response to the perforations in the secondary tape appertaining to toll or local calls, the pneumatics in punch positions 16 to 35 operate in accordance with the preliminary perforations relating to the calling line directory number to cause the type mechanism of the tabulator to be set in the same manner as previously described to print on the bill the calling line directory number.

What is claimed is:

1. In a system for the automatic tabulation and totalizing of a plurality of call charges chargeable to a subscriber's line responsive to a continuous record of a plurality of calls chargeable to said line in defined local charge units comprising a notation for each of said calls designating the number of said charge units to be assessed for said call, a tabulator for accumulating said charge units from said record comprising means therein for feeding said record therethrough, a first shaft, means for rotating said shaft, a second shaft, a differentially settable device driven therefrom, a third shaft, a call units counter operable therefrom, a fourth shaft, a money charge counter operable therefrom, selective gearing for driving said fourth shaft from said third shaft at different selectable speeds, sensing means operating in response to each local call notation of said record as said record is fed through said tabulator, means responsive to said sensing means for engaging said first shaft with said second shaft whereby said second shaft is caused to revolve one-tenth of a revolution for each charge unit of a notation, said differentially settable device being driven thereby one step for each definite number of charge units thus counted, means controlled by said differentially settable device for engaging said third shaft with said second shaft when said differentially settable device has advanced one step after counting a definite number of units, for driving said cell units counter to count the recorded units in excess of said definite number of units, and means controlled by said differentially settable device to successively engage said selective gearing whereby said money charge counter is driven by said fourth shaft from said third shaft to accumulate thereon the total money charge for units in excess of said definite number of units.

2. In a system for the automatic tabulation and totalizing of a plurality of call charges chargeable to a subscriber's line responsive to a continuous record of a plurality of calls chargeable to said line in defined local charge units comprising a notation for each of said calls designating the number of said charge units to be assessed for said call, a tabulator for accumulating said charge units from said record comprising means therein for feeding said record therethrough, a first shaft, means for rotating said first shaft, a second shaft, a differentially settable device driven therefrom, a third shaft, a call units counter operable therefrom, a fourth shaft, a money charge counter operable therefrom, selective gearing for driving said fourth shaft from said third shaft at different selectable speeds, sensing means operative in response to each notation of said record, means responsive to said sensing means for engaging said first shaft with said second shaft whereby said second shaft is caused to revolve one-tenth of a revolution for each charge unit of a notation, said differentially settable device being driven thereby one step for each definite number of charge units thus counted, means responsive to a notation designating more than ten charge units for a call on said record as said record is fed through said tabulator for causing said second shaft to maintain its engagement with said first shaft whereby said second shaft is caused to make as many additional revolutions as there are multiples of ten charge units designated by said notation, means controlled by said differentially settable device for engaging said third shaft with said second shaft when said differentially settable device has advanced one step after counting a definite number of units for driving said call units counter to count the recorded units in excess of said definite number of units, and means controlled by said differentially settable device to successively engage said selective gearing whereby said money charge counter is driven by said fourth shaft from said third shaft to accumulate thereon the total money charge for units in excess of said definite number of units.

3. A mechanism for computing charges in response to a plurality of series of perforations denoting several charge items appertaining to an account comprising a means for successively sensing each of said series of perforations, a differentially settable device, means controlled by said sensing means for advancing said settable device in accordance with the charge items denoted by each of said series of perforations whereby said device is positioned to represent the sum of the several charge items, a money charge counter, a plurality of selectively operable gear trains interconnecting said differentially settable device and said money charge counter, each of said gear trains operating said money charge counter from said differentially settable device at different charge rates, and means controlled by said differentially settable device in accordance with its position for selecting for operation one of said gear trains corresponding to said position, whereby said money charge counter is advanced at a charge rate for the various items determined by the sum of the charge items previously entered.

4. An adding mechanism operative in response to a tape containing thereon a plurality of series of perforations denoting several charge items appertaining to an account, comprising a call units counter, a money charge counter, a plurality of selectively operable gear trains interconnecting said counters, a differentially settable device for adding a maximum number of items, sensing means operative in response to said plurality of series of perforations on said tape, means responsive to said sensing means for operating said differentially settable device in accordance with the number of charge items denoted by a series of perforations, means responsive to the setting of said differentially settable device when it has counted a predetermined number of items for causing said call units counter to be operated with said differentially settable device to count all succeeding items, and other means responsive to said differentially settable device for selecting one of said gear trains for operation whereby said money charge counter is operated in accordance with the charge to be registered for each of said succeeding items.

5. An adding mechanism operative in response to a tape containing thereon a plurality of series of perforations denoting several charge items appertaining to an account comprising a call units counter, a money charge counter, a plurality of selectively operable gear trains interconnecting said counters, pneumatically controlled means responsive to said plurality of series of perforations on said tape, means for registering additively the charge items, means responsive to said pneumatically controlled means for causing said registering means to be advanced in accordance with the number of charge items represented by each of said series of perforations, means responsive to said registering means for selecting one of said gear trains for operation, and other means responsive to said registering means controlled through said gear selecting means for operating said call units counter concurrently with the advance of said registering means and for operating said selected gear train whereby said money charge counter is operated by said gear train in accordance with said registered number of items.

6. An adding mechanism operative in response to a tape containing thereon a plurality of series of perforations denoting several charge items appertaining to an account comprising a plurality of gear devices, a call units counter, a money charge counter, a differentially settable device adapted to take a setting for successive divisional groups of a fixed number of items, pneumatic sensing means responsive to said plurality of series of perforations on said tape, means responsive to said pneumatic sensing means for operating said differentially settable device, means responsive to said differentially settable device when set to each divisional group beyond the first for coupling said call units counter to said differentially settable device to count the items in each of said divisional groups, other means responsive to said differentially settable device when set on each of said divisional groups for selecting one of said plurality of gear devices, and means for operating said selected gear device to an extent determined by the operation of said differentially settable device whereby said money charge counter is operated by said selected gear device in accordance with the charge to be registered for the calls represented by the setting of said differentially settable device in the divisional group which determined the selecting of the gear device.

7. An adding mechanism operative in response to a tape containing thereon a plurality of series of perforations denoting several charge items appertaining to an account in which the charges for separate groups of items differ from each other, comprising a differentially settable device adapted to be advanced for successive items constituting divisional groups of a fixed number of items, a gear device for each separate group of items, a call units counter, a money charge counter, sensing means operative in response to said plurality of series of perforations on said tape, means responsive to said sensing means for advancing said differentially settable device to cause entries therein in accordance with each item sensed by said sensing means whereby said differentially settable device is set successively for each divisional group of items in response to the additive sensing of the number of items in each of said divisional groups, means responsive to the setting of said differentially settable device beyond the setting for the first divisional group for causing said call units counter to be operated to count each of the items entered into said differentially settable device in the divisional groups beyond the first, and means responsive to the different settings of said differentially settable device for successive groups of items beyond the first for successively selecting for operation each of said gear devices in accordance with said groups of items, said means for causing the operation of said call units counter being further effective to cause the operation of the selected gear device whereby said money charge counter is operated by said selected gear device in accordance with the number of items registered by said call units counter and in accordance with the charge for the corresponding group of items.

8. An adding mechanism operative in response to a tape containing thereon a plurality of series of perforations denoting several charge items appertaining to an account in which the charges for separate groups of items differ from each other, comprising a differentially settable device adapted to be advanced for successive items constituting divisional groups of a fixed number of items, a gear device for each separate group of items, a call units counter, a money charge counter, pneumatic sensing means operative in response to said plurality of series of perforations on said tape, means responsive to said pneumatic sensing means for advancing said differentially settable device to cause entries therein in accordance with each item sensed by said pneumatic sensing means whereby said differentially settable device is set successively for each divisional group of items in response to the additive sensing of the number of items in each of said divisional groups, means responsive to the setting of said differentially settable device beyond the setting for the first divisional group for causing said call units counter to be operated to count each of the items entered into said differentially settable device in the divisional groups beyond the first, and means responsive to the different setting of said differentially settable device for successive groups of items beyond the first for successively selecting for operation each of said gear devices in accordance with said groups of items, said means for causing the operation of said call units counter being further effective to cause the operation of the selected gear device whereby said money charge counter is operated by said selected gear device in accordance with the number of items registered by said call units counter and in accordance with the charge for the corresponding group of items.

CHARLES L. GOODRUM.
EDWARD E. HINRICHSEN.
LEO KELLER.